(12) United States Patent
Sano et al.

(10) Patent No.: US 10,473,913 B2
(45) Date of Patent: Nov. 12, 2019

(54) VARIABLE WAVELENGTH INTERFERENCE FILTER, OPTICAL MODULE, AND OPTICAL ANALYSIS DEVICE

(71) Applicant: Seiko Epson Corporation, Tokyo (JP)

(72) Inventors: Akira Sano, Shiojiri (JP); Yasushi Matsuno, Matsumoto (JP); Koji Kitahara, Ina (JP)

(73) Assignee: Seiko Epson Corporation (JP)

( * ) Notice: Subject to any disclaimer, the term of this patent is extended or adjusted under 35 U.S.C. 154(b) by 71 days.

(21) Appl. No.: 15/867,099

(22) Filed: Jan. 10, 2018

(65) Prior Publication Data

US 2018/0129035 A1 May 10, 2018

Related U.S. Application Data

(62) Division of application No. 13/355,835, filed on Jan. 23, 2012, now abandoned.

(30) Foreign Application Priority Data

Jan. 24, 2011 (JP) .................. 2011-012199

(51) Int. Cl.
*G02B 27/00* (2006.01)
*G02B 26/00* (2006.01)
(Continued)

(52) U.S. Cl.
CPC .............. *G02B 26/001* (2013.01); *G01J 3/26* (2013.01); *G01J 3/50* (2013.01); *G02B 5/284* (2013.01)

(58) Field of Classification Search
CPC .......... G02B 26/00; G02B 26/001–002; G02B 26/007–008; G02B 26/023; G02B 6/29358–29361; G02B 5/284; G02B 27/144; G02B 27/106; G02B 6/29395; G02B 5/288; G02B 1/111–116; G02B 27/142; G02B 5/0833; G02B 5/0858; G02B 5/282; G02B 5/289; G02B 5/201;
(Continued)

(56) References Cited

U.S. PATENT DOCUMENTS

2003/0117681 A1* 6/2003 Tayebati ................ B82Y 20/00
  359/240
2005/0052746 A1 3/2005 Shih et al.
(Continued)

FOREIGN PATENT DOCUMENTS

JP 01-094312 A 4/1989
JP 2003-057571 A 2/2003
(Continued)

*Primary Examiner* — Stephone B Allen
*Assistant Examiner* — Jyotsna V Dabbi
(74) *Attorney, Agent, or Firm* — Harness, Dickey & Pierce, P.L.C.

(57) ABSTRACT

An etalon includes a first substrate, a second substrate facing the first substrate, a fixed mirror provided on a surface of the first substrate that faces the second substrate, a movable mirror provided on the second substrate and facing the fixed mirror via an inter-mirror gap, and a first electrode provided on the surface of the first substrate that faces the second substrate. A first multilayer stopper portion is provided by a portion of the first electrode being stacked with at least a portion of an outer circumferential edge of the fixed mirror.

2 Claims, 16 Drawing Sheets

(51) Int. Cl.
*G01J 3/26* (2006.01)
*G01J 3/50* (2006.01)
*G02B 5/28* (2006.01)

(58) Field of Classification Search
CPC .......... G01J 3/26; G01J 3/50–501; G01J 3/51;
G01J 3/46; G01J 11/00; G01J 3/02; G01J
3/4535; G01J 3/453; G01J 3/477; G01J
3/4537; G01J 3/2823; G01J 2009/0257;
G02F 1/21; G01B 9/02; G01B 9/021;
G01B 9/04; G01B 11/2441; G01N 21/45;
G01N 21/7703
USPC ........................................................ 359/578
See application file for complete search history.

(56) References Cited

U.S. PATENT DOCUMENTS

| | | |
|---|---|---|
| 2009/0306479 A1 | 12/2009 | Kamihara |
| 2010/0103522 A1 | 4/2010 | Matsumoto |
| 2010/0302660 A1 | 12/2010 | Hirokubo et al. |

FOREIGN PATENT DOCUMENTS

| | | |
|---|---|---|
| JP | 2003-185941 A | 7/2003 |
| JP | 2003-195189 A | 7/2003 |
| JP | 2003-215473 A | 7/2003 |
| JP | 2005-017468 A | 1/2005 |
| JP | 2008-197362 A | 8/2008 |
| JP | 2010-008644 A | 1/2010 |
| JP | 2011-008225 A | 1/2011 |
| JP | 2011-081055 A | 4/2011 |

\* cited by examiner

VARIABLE WAVELENGTH INTERFERENCE FILTER, OPTICAL MODULE, AND OPTICAL ANALYSIS DEVICE

CROSS-REFERENCE TO RELATED APPLICATIONS

This is a divisional patent application of U.S. application Ser. No. 13/355,835 filed Jan. 23, 2012, which claims priority to Japanese Patent Application No. 2011-012199 filed Jan. 24, 2011, both of which are expressly incorporated by reference herein in their entireties.

BACKGROUND

1. Technical Field

The present invention relates to a variable wavelength interference filter, an optical module including the variable wavelength interference filter, and an optical analysis device including the optical module.

2. Related Art

In the related art, a variable interference device (variable wavelength interference filter) is known in which reflection films face each other across a predetermined gap. The reflection films are arranged on surfaces of a pair of substrates that face each other (see, for example, JP-A-1-94312).

In the variable wavelength interference filter described in JP-A-1-94312, electrodes for adjusting the gap are arranged to face each other by locating them on the surfaces of the pair of reflection films that face each other. As a drive voltage is applied to each electrode, the gap can be adjusted by electrostatic attraction. Thus, the variable wavelength interference filter only transmits light with a specific wavelength corresponding to the gap. That is, the variable wavelength interference filter performs multiple interference of incident light between the pair of reflection films and transmits only light with a specific wavelength that is intensified by the multiple interferences between the reflection films.

While manufacturing such a variable wavelength interference filter, however, there is a risk that the reflection films may stick to each other when the substrates are bonded to each other. Also, there is a risk that the reflection films may stick to each other when the gap is adjusted or due to an impact or the like when an external force is applied. Such sticking of the reflection films causes damage to the surfaces of the reflection films and therefore lowers the optical properties (transmittance and reflectance) of the reflection films.

To prevent the reflection films from sticking to each other, it is conceivable to provide a protrusion near the reflection films.

However, if such a protrusion is to be provided, a process of providing the protrusion is separately needed in the process of manufacturing the variable wavelength interference filter. Therefore, there is a problem in that the configuration becomes complicated.

SUMMARY

An advantage of some aspects of the invention is that a variable wavelength interference filter, an optical module and an optical analysis device are provided in which reflection films can be prevented from sticking to each other by a simple configuration.

An aspect of the invention is directed to a variable wavelength interference filter including: a first substrate; a second substrate facing the first substrate; a first reflection film provided on a first surface of the first substrate, the first surface facing the second substrate; a second reflection film provided on the second substrate and facing the first reflection film with a predetermined gap therebetween; and a first electrode provided on the first surface of the first substrate. A first multilayer stopper portion is provided by stacking a portion of the first electrode and at least a portion of an outer circumferential edge of the first reflection film.

According to this aspect of the invention, the first multilayer stopper portion formed by stacking a portion of the first electrode and at least a portion of the outer circumferential edge of the first reflection film is provided. Thus, the dimension between the first multilayer stopper portion and the second reflection film is smaller than the dimension of the gap between the reflection films. Therefore, when the gap dimension between the reflection films is reduced, the first multilayer stopper portion and the second reflection film contact each other. Thus, the reflection films can be prevented from sticking to each other.

Also, according to this aspect of the invention, since the first multilayer stopper portion is formed by stacking the first electrode and the first reflection film, the aforementioned protrusion need not be provided separately on the reflection films and can be provided by implementing the process of forming the first reflection film and the first electrode. Therefore, the manufacturing process can be simplified and a simple configuration can be realized.

In the variable wavelength interference filter, it is preferable that a second electrode is provided on a surface of the second substrate that faces the first substrate, and that a second multilayer stopper portion be provided by stacking a portion of the second electrode and at least a portion of an outer circumferential edge of the second reflection film.

According to this configuration, the second multilayer stopper portion is formed on the second substrate. In such a configuration, since the second multilayer stopper portion which prevents the reflection films from sticking to each other is provided on the second substrate side, the reflection films can be more securely prevented from sticking to each other.

Here, as viewed in a plan view of the first substrate and the second substrate, if the second multilayer stopper portion is formed at a position overlapping the first multilayer stopper portion, the first multilayer stopper portion and the second multilayer stopper portion abut each other and can prevent the first and second reflection films from contacting each other. In this case, a gap is provided between the first substrate and the second substrate, corresponding to the total of a thickness dimension of the first multilayer stopper portion and a thickness dimension of the second multilayer stopper portion. Therefore, the gap dimension between the reflection films can be made greater and the contacting and sticking of the reflection films can be more securely prevented than, for example, in the case where the reflection films are prevented from contacting each other by the first multilayer stopper portion alone.

Also, the first multilayer stopper portion and the second multilayer stopper portion may be provided at positions that do not overlap each other at all, as viewed in the plan view. In this case, as compared with the case where the reflection films are prevented from contacting and sticking to each other by the first multilayer stopper portion alone, the area of the stopper portion for preventing the reflection films from contacting and sticking to each other is increased by the provision of the second multilayer stopper portion, and the stopper portions can counter a greater stress.

In the variable wavelength interference filter, it is preferable that a second electrode facing the first electrode is provided on the second substrate, and that the first electrode and the second electrode are drive electrodes which change a dimension of the gap as a voltage is applied thereto.

According to this configuration, the first electrode and the second electrode are drive electrodes and therefore can also function as a gap changing unit which changes the dimension of the gap. That is, in the process of manufacturing the variable wavelength interference filter, the need for a process of separately providing the aforementioned protrusion can be eliminated and the first multilayer stopper portion can be easily formed by the process of forming the first reflection film and the process of forming the drive electrodes. Thus, a simple manufacturing process can be realized and the structure can be simplified.

In the variable wavelength interference filter, it is preferable that a second electrode facing the first electrode is provided on the second substrate, and that the first electrode and the second electrode are electrostatic capacitance measuring electrodes which measure an electrostatic capacitance held between the first electrode and the second electrode.

According to this configuration, the first electrode and the second electrode function as electrostatic capacitance measuring electrodes. In the variable wavelength interference filter provided with such electrostatic capacitance measuring electrodes, the gap between the first reflection film and the second reflection film can be calculated by measuring the quantity of electric charge held by the first electrode and the second electrode. Therefore, the wavelength of light extracted by the variable wavelength interference filter can be found accurately. By setting a gap between the first reflection film and the second reflection film based on this electrostatic capacitance, a desired gap can be accurately set as the gap between the reflection films.

Moreover, in the process of manufacturing the variable wavelength interference filter, the first multilayer stopper portion can be easily formed by the process of forming the first reflection film and the process of forming the electrostatic capacitance measuring electrodes.

In the variable wavelength interference filter, it is preferable that the first electrode is an electric charge removing electrode which removes an electric charge from the first reflection film.

According to this configuration, the first electrode functions as an electric charge removing electrode which removes an electric charge from the first reflection film. Also, when the dimension of the gap between the reflection film is decreased and the first multilayer stopper portion contacts the second reflection film, an electric charge held in the second reflection film can also be released from the electric charge removing electrode of the first multilayer stopper portion. Therefore, electrostatic attraction due to the electric charges held in the first reflection film and the second reflection film does not occur and the gap between the reflection films can be set with a desired gap dimension.

In the variable wavelength interference filter, it is preferable that, in the first multilayer stopper portion, the first reflection film and the first electrode are stacked in this order from the first substrate.

Generally, a reflection film deposited on a substrate has a problem in that an outer circumferential edge part thereof can be detached relatively easily and the reflection film deteriorates easily. However, according to this configuration, the first multilayer stopper portion is configured so that the first electrode is stacked on the first reflection film. Therefore, the first electrode securely protects the edge part of the first reflection film and deterioration of the first reflection film can be prevented.

In the variable wavelength interference filter, it is preferable that, in the first multilayer stopper portion, the first electrode and the first reflection film are stacked in this order from the first substrate.

According to this configuration, in the first multilayer stopper portion, the first electrode and the first reflection film are stacked in this order from the first substrate. According to this, since the first reflection film is deposited after the first electrode is deposited on the first substrate, the process of forming the first reflection film can be shifted further to a later stage and damage to the first reflection film during the manufacturing process can be prevented further.

Also, in the case where the first reflection film is, for example, a dielectric multilayer film in which insulating layers of $SiO_2$, $TiO_2$ and the like are stacked, and the second electrode facing the first electrode is provided on the second substrate, if the entire area facing the second electrode, of the first electrode, is covered with the first reflection film to form the first multilayer stopper portion, the first reflection film can be used as an insulating layer. In this case, the first multilayer stopper portion can prevent the reflection films from contacting and sticking to each other and can also prevent inconvenience such as discharge or leak between the first electrode and the second electrode.

In the variable wavelength interference filter, it is preferable that the first electrode is made of a non-light-transmissive material, and that the first multilayer stopper portion is provided in a ring shape prescribing a light transmitting area for incident light transmitted through the first reflection film and the second reflection film, as viewed in a plan view of the first substrate and the second substrate.

The non-light-transmissive material in this description means a material that does not transmit light of a wavelength range that is a measuring target of the variable wavelength interference filter. Therefore, if the wavelength range that is a measuring target is visible light, a metallic material that can transmit infrared rays and does not transmit a visible light range such as Si may be used for the first electrode.

According to this configuration, since the first electrode of the non-light-transmissive material and the first reflection film are stacked to form the ring-shaped first multilayer stopper portion, an area of the first reflection film that is exposed inside the non-light-transmissive first multilayer stopper portion is a light transmitting area for incident light, and the first multilayer stopper portion can be used as an aperture. By using such a variable wavelength interference filter and measuring the quantity of light extracted by the variable wavelength interference filter, accurate light quantity measurement can be carried out.

In the variable wavelength interference filter, it is preferable that the second electrode is provided on a surface of the second substrate that faces the first substrate, that a portion of the second electrode is stacked on an outer circumferential edge of the second reflection film to form a ring-shaped second multilayer stopper portion, and that an inner diameter dimension of the first multilayer stopper portion is smaller than an inner diameter dimension of the second multilayer stopper portion, as viewed in a plan view of the first substrate and the second substrate.

According to this configuration, the inner diameter dimension of the first multilayer stopper portion is made smaller than the inner diameter dimension of the second multilayer stopper portion. That is, the light transmitting area is prescribed by the inner diameter dimension of the first multilayer stopper portion.

Generally, it is difficult to align two apertures having the same inner diameter dimension in such a manner that the inner diameter portions thereof match each other perfectly. If misalignment occurs, the quantity of light transmitted changes, too. On the other hand, if the inner diameter dimension of the first multilayer stopper portion is made smaller than the inner diameter dimension of the second multilayer stopper portion, as described above, the inner diameter portion of the first multilayer stopper portion can be easily installed so that it is situated on the inner circumferential side of the second multilayer stopper portion, as compared with the case where the inner diameter of the first multilayer stopper portion and the inner diameter of the second multilayer stopper portion are made to match each other perfectly. Also, since the first multilayer stopper portion with the smaller inner diameter dimension prescribes the light transmitting area, the light transmitting area can be prescribed easily and accurately. Thus, the quantity of light transmitted through the light transmitting area can be easily set to a desired value.

Another aspect of the invention is directed to an optical module including the aforementioned variable wavelength interference filter, and a light receiving unit which receives inspection target light transmitted through the variable wavelength interference filter.

According to this aspect of the invention, in the variable wavelength interference filter, the reflection films can be prevented from sticking to each other with a simple configuration. Also, a reduction in the optical performance of the reflection films can be prevented and the resolution can be maintained highly accurately. Therefore, in the optical module having such a variable wavelength interference filter, highly accurate light quantity measurement can be carried out by the light receiving unit.

Still another aspect of the invention is directed to an optical analysis device including the aforementioned optical module, and an analytical processing unit which analyzes an optical property of the inspection target light based on light received by the light receiving unit of the optical module.

According to this aspect of the invention, since the optical module having the variable wavelength interference filter is provided, highly accurate measurement can be carried out. As optical analytical processing is carried out based on the result of this measurement, accurate spectroscopic properties can be implemented.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.

1. Schematic Configuration of Colorimeter Device

Figure 1:
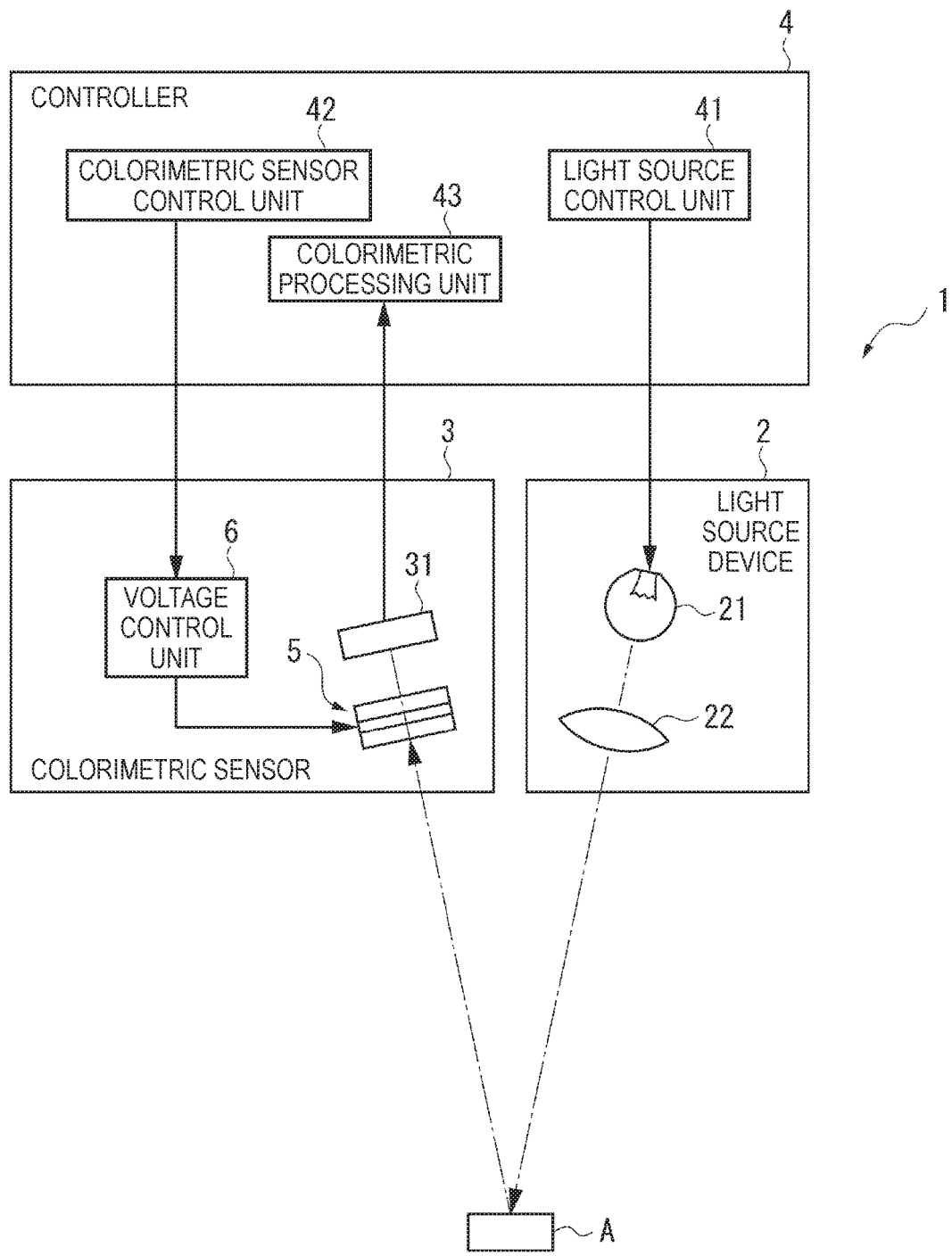
FIG. 1 a block diagram showing a schematic configuration of a colorimeter device according to a first embodiment of the invention.

FIG. 1 is a block diagram showing a schematic configuration of a colorimeter device 1 (optical analysis device) according to this embodiment.

The colorimeter device 1 includes a light source device 2 which emits light to an inspection target A, a colorimetric sensor 3 (optical module), and a controller 4 which controls the overall operation of the colorimeter device 1, as shown in FIG. 1. In this colorimeter device 1, light emitted from the light source device 2 is reflected on the inspection target A and the reflected inspection target light is received by the colorimetric sensor 3. Based on a detection signal outputted from the colorimetric sensor 3, the chromaticity of the inspection target light, that is, the color of the inspection target A, is analyzed and measured.

2. Configuration of Light Source Device

The light source device 2 includes a light source 21 and plural lenses 22 (in FIG. 1, only one lens is shown), and emits white light toward the inspection target A. The plural lenses 22 may include a collimating lens. In such case, in the light source device 2, white light emitted from the light source 21 is turned into parallel beams by the collimating lens and is then emitted toward the inspection target A from a projection lens, not shown. In this embodiment, the colorimeter device 1 having the light source device 2 is described as an example. However, for example, in the case where the inspection target A is a light emitting member such as a liquid crystal panel, a configuration without having the light source device 2 may be employed.

3. Configuration of Colorimetric Sensor

The colorimetric sensor 3 includes an etalon 5 (variable wavelength interference filter), a light receiving element 31 (light receiving unit) which receives light transmitted through the etalon 5, and a voltage control unit 6 which varies the wavelength of light to be transmitted at the etalon 5, as shown in FIG. 1. The colorimetric sensor 3 has a light-incident optical lens, not shown, which guides inward the reflected light (inspection target light) reflected by the inspection target A, at a position facing the etalon 5. In the colorimetric sensor 3, light with a predetermined wavelength, of the inspection target light incident from the light-incident optical lens, is spectrally separated by the etalon 5 and the separated light (filtered light) is received by the light receiving element 31.

The light receiving element 31 includes plural photoelectric converter elements and generates an electric signal corresponding to the quantity of light received. The light receiving element 31 is connected to the controller 4 and outputs the generated electric signal to the controller 4 as a light receiving signal.

3-1. Configuration of Etalon

Figure 2:
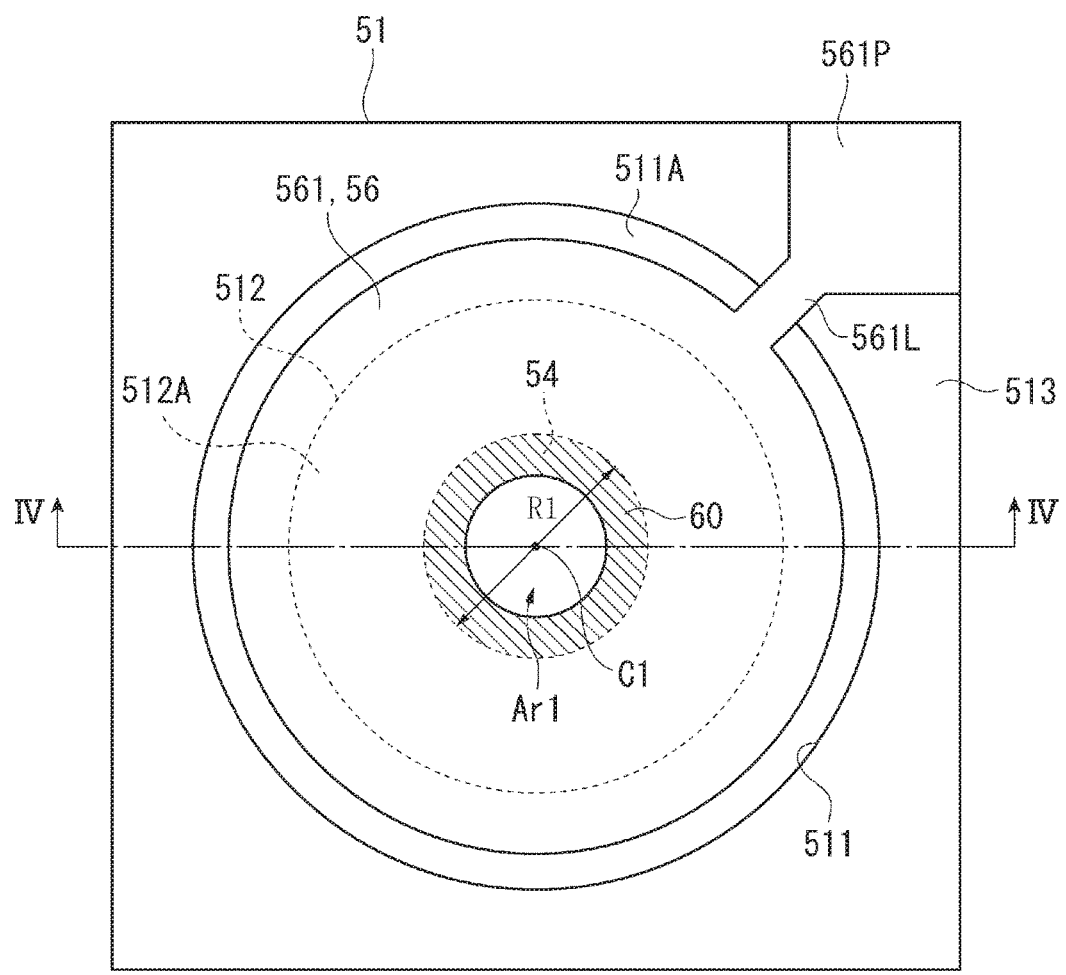
FIG. 2 is a plan view of a first substrate of an etalon according to the first embodiment.
Figure 3:
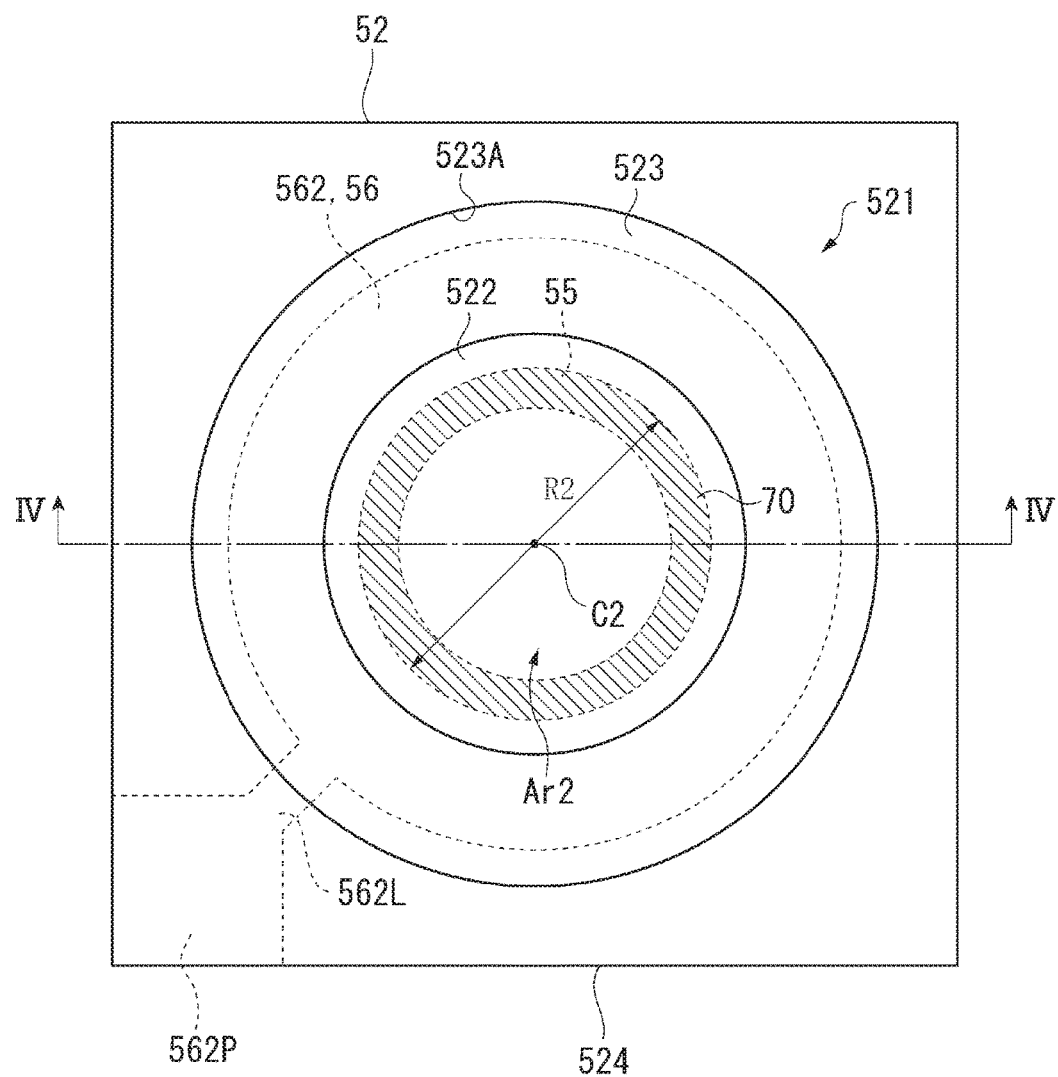
FIG. 3 is a plan view of a second substrate of the etalon according to the first embodiment.
Figure 4:
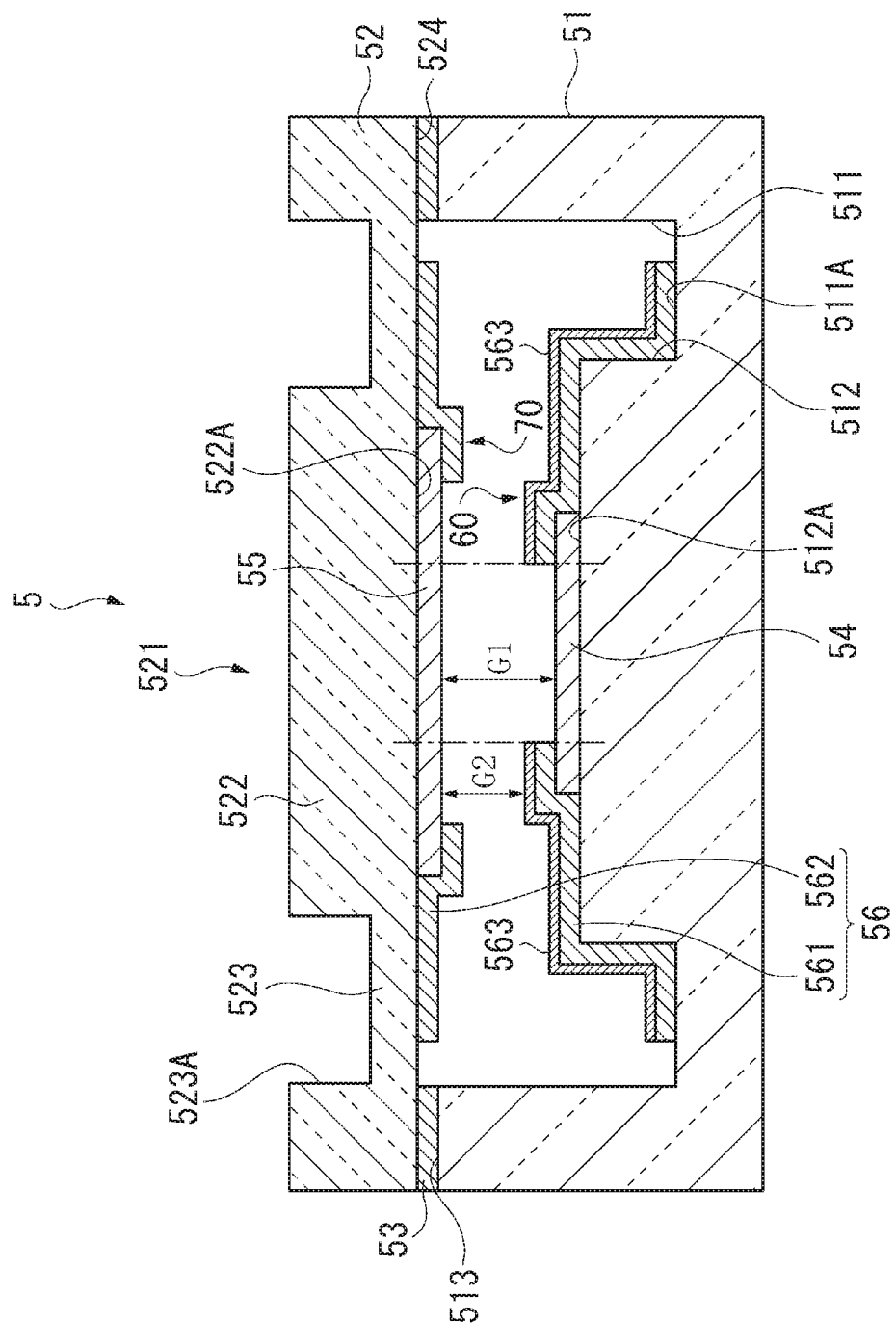
FIG. 4 is a sectional view showing a schematic configuration of the etalon according to the first embodiment.

FIG. 2 is a plan view of a first substrate 51 of the etalon 5. FIG. 3 is a plan view of a second substrate 52 of the etalon 5. FIG. 4 is a sectional view of the etalon 5, taken along arrow line IV-IV in FIG. 2 and FIG. 3. It should be noted that in FIG. 1, inspection target light becomes incident on the etalon 5 from the bottom side of the drawing, whereas in FIG. 4, inspection target light becomes incident from the top side of the drawing.

As shown in FIG. 2 and FIG. 3, the first substrate 51 and the second substrate 52 are optical members in the shape of a square plate as viewed in a plan view, for example, with one side being 10 mm. As shown in FIG. 4, this etalon 5 includes the first substrate 51 and the second substrate 52. These substrates 51, 52 are bonded to each other and integrally formed via a bonding layer 53 by siloxane bonding using a plasma polymerized film or the like. Each of the two substrates 51, 52 is made of, for example, various kinds of glass such as soda-lime glass, crystalline glass, quartz glass, lead glass, potassium glass, borosilicate glass, and non-alkaline glass, or crystal and the like.

Between the first substrate 51 and the second substrate 52, a fixed mirror 54 (first reflection film) having a diameter dimension R1 and a movable mirror 55 (second reflection film) having a diameter dimension R2 are provided, as shown in FIG. 2 and FIG. 4. Here, the fixed mirror 54 is formed on a surface of the second substrate 52 that faces the first substrate 51. The movable mirror 55 is formed on a surface of the first substrate 51 that faces the second substrate 52. The fixed mirror 54 and the movable mirror 55 are arranged to face each other across an inter-mirror gap G1.

Moreover, an electrostatic actuator 56 for adjusting the inter-mirror gap G1 between the mirrors 54, 55 is provided between the first substrate 51 and the second substrate 52. The electrostatic actuator 56 is formed in a ring shape, as viewed in a plan view in a direction of substrate thickness (hereinafter referred to as a plan view of the etalon), so as to cover an outer circumferential edge of each of the mirrors 54, 55. The configuration of the electrostatic actuator 56 will be described in detail later.

3-1-1. Configuration of First Substrate

The first substrate 51 is formed by processing a glass base material with a thickness of, for example, 500 μm, by etching. As shown in FIG. 2 and FIG. 4, an electrode forming groove 511 and a mirror fixing portion 512 are formed on the first substrate 51 by etching.

In the electrode forming groove 511, an electrode fixing surface 511A which is ring-shaped, as viewed in the plan view of the etalon, is formed from an outer circumferential edge of the mirror fixing portion 512 to an inner circumferential wall surface of the electrode forming groove 511, as shown in FIG. 2 and FIG. 4.

In the mirror fixing portion 512, a mirror fixing surface 512A that is formed substantially in a cylindrical shape coaxial with the electrode forming groove 511 and having a smaller diameter dimension than the electrode forming groove 511 is provided on a surface on the side facing the second substrate 52, as shown in FIG. 2 and FIG. 4.

On the mirror fixing surface 512A, the fixed mirror 54 formed by a circular single layer of an AgC alloy that can cover the entire visible light range as a spectrally separable wavelength range, is fixed. In this embodiment, a mirror of a single layer of an AgC alloy is used as an example of the fixed mirror 54. However, a $TiO_2$—$SiO_2$-based dielectric multilayer film, a mirror of an Ag alloy other than AgC alloys, or a multilayer film mirror including an Ag alloy and a dielectric film may be used.

On the first substrate 51, a first electrode 561 is formed which extends toward the outer circumferential edge of the mirror fixing surface 512A from the electrode fixing surface 511A and which covers the outer circumferential edge of the fixed mirror 54 formed on the mirror fixing surface 512A.

The first electrode 561 is formed in a ring shape, as viewed in the plan view of the etalon. The outer circumferential edge of the fixed mirror 54 and the inner circumferential edge of the first electrode 561 are stacked in this order from the first substrate 51. Thus, a first multilayer stopper portion 60 (shaded part in FIG. 2) formed in a ring shape, as viewed in the plan view of the etalon, is configured. That is, the first multilayer stopper portion 60 is formed along the circumferential direction of an imaginary circle that centers on a center point C1 (see FIG. 2) of the fixed mirror 54.

Since the first multilayer stopper portion 60 is provided on the outer circumferential edge of the fixed mirror 54, a light transmitting area Ar1 (see FIG. 2) of the fixed mirror 54 is exposed. A gap G2 between the first multilayer stopper portion 60 and the movable mirror 55 is smaller than the inter-mirror gap G1. Therefore, when the inter-mirror gap G1 is reduced by the electrostatic actuator 56, the movable mirror 55 abuts the first multilayer stopper portion 60. Even when the mirrors 54, 55 are close to each other, the mirrors 54, 55 are prevented from sticking to each other.

On the top surface of the first electrode 561, as shown in FIG. 4, an insulating film 563 is formed in order to prevent a leak due to discharge or the like between the first electrode 561 and a second electrode 562 on the second substrate 52, which will be described later. That is, the insulating film 563 also covers the first multilayer stopper portion 60.

As the insulating film 563, $SiO_2$, TEOS (tetraethoxysilane) or the like can be used. Particularly, $SiO_2$ having the same optical properties as the glass substrate forming the first substrate 51 is preferable. If $SiO_2$ is used as the insulating film 563, since there is no reflection or the like of light between the first substrate 51 and the insulating film, the insulating film can be formed on the entire surface of the first substrate 51 on the side facing the second substrate 52 after the first electrode 561 is formed on the first substrate 51.

The first electrode 561 is electrically conductive and non-light-transmissive. The first electrode 561 is not particularly limited as long as electrostatic attraction can be generated between the first electrode 561 and the second electrode 562 by application of a voltage between the first electrode 561 and the second electrode 562 on the second substrate 52, which will be described later. However, in this embodiment, an Au/Cr metal multilayer body is used.

An insulating film may also be formed on the second electrode 562, which will be described later, similarly to the first electrode 561.

One first electrode line 561L is formed extending toward top right from a portion of the outer circumferential edge of the first electrode 561 so as to follow a diagonal line across the first substrate 51, as viewed in the plan view shown in FIG. 2.

A first electrode pad 561P is formed at a distal end of the first electrode line 561L. The first electrode pad 561P is connected to the voltage control unit 6 (see FIG. 1). At the time of driving the electrostatic actuator 56, a voltage is applied to the first electrode pad 561P by the voltage control unit 6 (see FIG. 1).

Here, a portion of the first substrate 51 where the electrode forming groove 511 and the mirror fixing portion 512 are not formed serves as a bonding surface 513 of the first substrate 51. As shown in FIG. 4, the bonding layer 53 for bonding is formed on the bonding surface 513. For the bonding layer 53, a plasma polymerized film using polyorganosiloxane as a principal material or the like can be used.

3-1-2. Configuration of Second Substrate

The second substrate 52 is formed by processing a glass base material having a thickness of, for example, 200 µm, by etching. On this second substrate 52, a circular displaced portion 521 centering on the center point of the substrate, as viewed in the plan view of the etalon shown in FIG. 3, is formed. This displaced portion 521 has a connection holding portion 523 which is coaxial with a columnar movable portion 522 that is movable toward and retreats from the first substrate 51, and which is formed in a circular ring shape, as viewed in the plan view of the etalon, and holds the movable portion 522 movably in the direction of the thickness of the second substrate 52, as shown in FIG. 3 and FIG. 4.

The displaced portion 521 is formed by forming a groove by etching the flat plate-like glass base material as the forming material of the second substrate 52. That is, the displaced portion 521 is formed by forming a circular ring-shaped groove portion 523A for forming the connection holding portion 523 by etching on the light incident side of the second substrate 52 that does not face the first substrate 51.

The movable portion 522 is formed to a greater thickness dimension than the connection holding portion 523. For example, in this embodiment, the movable portion 522 is formed to 200 µm, which is the same dimension as the thickness dimension of the second substrate 52. The diameter dimension of the movable portion 522 is greater than the diameter dimension of the mirror fixing portion 512 of the first substrate 51.

On a surface of the movable portion 522 that faces the first substrate 51, a movable surface 522A parallel to the mirror fixing surface 512A on the first substrate 51 is provided. On the movable surface 522A, the movable mirror 55 facing the fixed mirror 54, and the second electrode 562 facing the first electrode 561 are formed. Here, the second electrode 562 and the first electrode 561 form the electrostatic actuator 56.

The movable mirror 55 is made of the same material as the fixed mirror 54 and is formed with the diameter dimension R2 greater than the diameter dimension R1 of the fixed mirror 54. The movable mirror 55 is provided so as to overlap the fixed mirror 54, as viewed in the plan view of the etalon.

The second electrode 562 is made of the same material as the first electrode 561. Also, the second electrode 562 is formed in a ring shape, as viewed in the plan view of the etalon, and is formed so that the inner circumferential edge thereof covers the outer circumferential edge of the movable mirror 55. The outer circumferential edge of the movable mirror 55 and the inner circumferential edge of the second electrode 562 are stacked in this order from the second substrate 52. Thus, a second multilayer stopper portion 70 (shaded part in FIG. 3) formed in a ring shape, as viewed in the plan view of the etalon, is configured. That is, the second multilayer stopper portion 70 is formed along the circumferential direction of an imaginary circle centering on a center point C2 (see FIG. 3) of the movable mirror 55.

Since the second multilayer stopper portion 70 is provided on the outer circumferential edge of the movable mirror 55, a light transmitting area Ar2 (see FIG. 3) of the movable mirror 55 is exposed. Since the movable mirror 55 is larger than the fixed mirror 54, the light transmitting area Ar2 of the movable mirror 55 is set to be greater than the light transmitting area Ar1 of the fixed mirror 54. That is, the inner diameter dimension of the second multilayer stopper portion 70 is made greater than the inner diameter dimension of the first multilayer stopper portion 60. Therefore, the quantity of light transmitted through the etalon 5, of the inspection target light incident from the top side of the second substrate 52, is prescribed by the inner diameter dimension of the first multilayer stopper portion 60, that is, the light transmitting area Ar1 of the fixed mirror 54.

For the second electrode 562, an Au/Cr metal multilayer body of the same material as the first electrode 561 is used. However, light-transmissive ITO (indium tin oxide) may also be used.

Moreover, the inner diameter dimension of the second multilayer stopper portion 70 is made greater than the outer dimension R1 of the first multilayer stopper portion 60. That is, the first multilayer stopper portion 60 is provided at a position that it does not overlap the second multilayer stopper portion 70, as viewed in a plan view in the direction of substrate thickness of the etalon 5.

The connection holding portion 523 is a diaphragm surrounding the periphery of the movable portion 522 and is formed to a thickness dimension of, for example, 50 µm.

One second electrode line 562L is formed extending toward bottom left from a portion of the outer circumferential edge of the second electrode 562 so as to follow a diagonal line across the second substrate 52, as viewed in the plan view of the etalon shown in FIG. 3.

A second electrode pad 562P is formed at a distal end of the second electrode line 562L. The second electrode pad 562P is connected to the voltage control unit 6 (see FIG. 1). At the time of driving the electrostatic actuator 56, a voltage is applied to the second electrode pad 562P by the voltage control unit 6 (see FIG. 1).

Here, an area facing the bonding surface 513 of the first substrate 51, on the surface of the second substrate 52 that faces the first substrate 51, serves as a bonding surface 524 of the second substrate 52. On the bonding surface 524, the bonding layer 53 using polyorganosiloxane as a principal material is provided, similarly to the bonding surface 513 of the first substrate 51.

3-2. Configuration of Voltage Control Unit

The voltage control unit 6 controls the voltage applied to the first electrode 561 and the second electrode 562 of the electrostatic actuator 56, based on a control signal inputted from the controller 4.

4. Configuration of Controller

The controller 4 controls overall operation of the colorimeter device 1. As the controller 4, for example, a general-purpose personal computer, personal digital assistant, computer for colorimetry or the like can be used.

The controller 4 includes alight source control unit 41, a colorimetric sensor control unit 42, a colorimetric processing unit 43 (analytic processing unit) and the like, as shown in FIG. 1.

The light source control unit 41 is connected to the light source device 2. The light source control unit 41 outputs a predetermined control signal to the light source device 2, for example, based on user's setting input, and thus causes the light source device 2 to emit white light of predetermined brightness.

The colorimetric sensor control unit 42 is connected to the colorimetric sensor 3. The colorimetric sensor control unit 42 sets a wavelength of light to be received by the colorimetric sensor 3, for example, based on user's setting input, and outputs to the colorimetric sensor 3 a control signal indicating that the quantity of light received with this wavelength should be detected. Thus, based on the control signal, the voltage control unit 6 of the colorimetric sensor 3 sets an applied voltage to the electrostatic actuator 56 so that the wavelength of light desired by the user will be transmitted.

The colorimetric processing unit 43 controls the colorimetric sensor control unit 42 to alter the inter-mirror gap in the etalon 5 and thus changes the wavelength of light transmitted through the etalon 5. Also, the colorimetric processing unit 43 acquires the quantity of light of the light transmitted through the etalon 5, based on a light receiving signal inputted from the light receiving element 31. Based on the quantity of light received with each wavelength that is acquired by the above processing, the colorimetric processing unit 43 calculates chromaticity of the light reflected by the inspection target A.

5. Advantages and Effects of First Embodiment

The etalon 5 according to the first embodiment has the following advantages.

(1) The inner circumferential edges of the ring-shaped first electrode 561 and second electrode 562 and the outer circumferential edges of the circular fixed mirror 54 and movable mirror 55 are stacked to form the multilayer stopper portions 60, 70. Thus, since the dimension of the gap G2 between the multilayer stopper portions 60, 70 and the mirrors 54, 55 is smaller than the dimension of the inter-mirror gap G1, the multilayer stopper portions 60, 70 contact an opposing surface when the dimension of the inter-mirror gap G1 is reduced. Therefore, there is no sticking of the mirrors 54, 55. The mirrors 54, 55 can be prevented from sticking to each other.

Moreover, since the multilayer stopper portions 60, 70 are formed by stacking the electrodes 561, 562 and the mirrors 54, 55, the protrusion having the configuration of the related art need not be provided separately. The manufacturing process can be simplified and a simple configuration can be realized. That is, the multilayer stopper portions 60, 70 can be easily formed simply by implementing the process of forming the electrodes 561, 562 and the process of forming the mirrors 54, 55.

(2) The first electrode 561 and the second electrode 562 are drive electrodes and therefore can also serve as the electrostatic actuator 56 which changes the dimension of the inter-mirror gap G1. That is, in the process of manufacturing the etalon 5, the process of separately providing the protrusion having the configuration of the related art can be eliminated. Thus, the manufacturing process can be simplified and a simple structure can be realized.

(3) Since the multilayer stopper portions 60, 70 are configured with the electrodes 561, 562 stacked on the mirrors 54, 55, the electrodes 561, 562 can securely protect the edges of the mirrors 54, 55 and prevent deterioration of the mirrors 54, 55.

(4) Since the electrodes 561, 562 of the non-light-transmissive material and the mirrors 54, 55 are stacked to form the multilayer stopper portions 60, 70, the smaller one of the areas of the mirrors 54, 55 exposed inside the non-light-transmissive multilayer stopper portions 60, 70 is the light transmitting area for incident light. Moreover, in this embodiment, since diameter dimension R1 of the fixed mirror 54 is smaller than the diameter dimension R2 of the movable mirror 55, the exposed light transmitting area Ar1 of the fixed mirror 54 is the light transmitting area for incident light. Therefore, in the manufacturing process, even when it is difficult to form the diameter dimensions R1, R2 of the mirrors 54, 55 to the same dimension, the light transmitting area Ar1 can be prescribed easily and accurately by forming the multilayer stopper portions 60, 70. Thus, the quantity of light transmitted through the light transmitting area Ar1 can be easily set to a desired value.

(5) The outer dimension R1 of the first multilayer stopper portion 60 is made smaller than the inner diameter dimension of the second multilayer stopper portion 70, and the first multilayer stopper portion 60 and the second multilayer stopper portion 70 do not overlap each other, as viewed in a plan view where the etalon 5 is viewed from a direction of substrate thickness. Therefore, when a large stress is applied in the direction of the substrate thickness of the etalon 5, the area of the contact site is larger and the pressure can be dispersed better than when only the first multilayer stopper portion 60 is formed or when the first multilayer stopper portion 60 and the second multilayer stopper portion contact each other. Therefore, the first multilayer stopper portion 60 and the second multilayer stopper portion 70 can be prevented from being damaged by stress.

First Modification of First Embodiment

Figure 5:
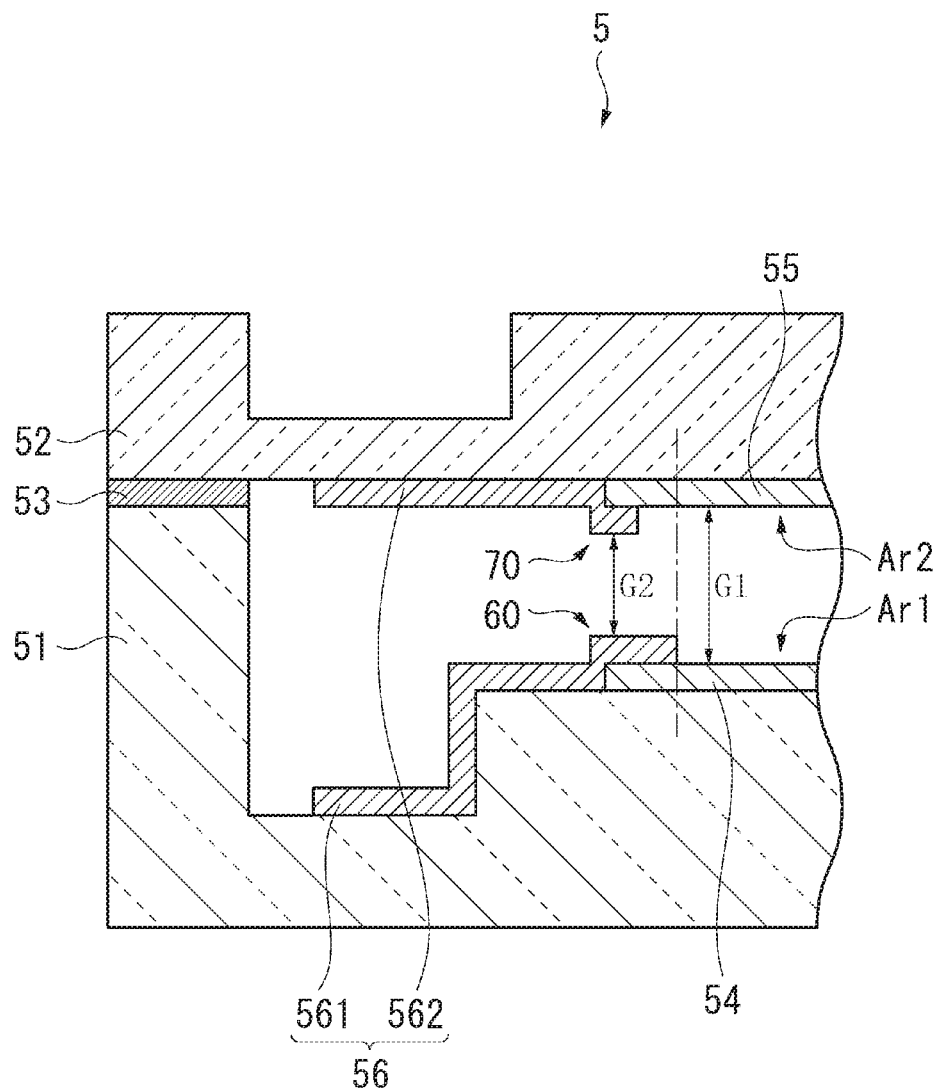
FIG. 5 is a partial sectional view showing parts of an etalon according to a first modification of the first embodiment.

FIG. 5 is a partial sectional view showing parts of the etalon 5 according to a first modification of the first embodiment.

In the first embodiment, the first multilayer stopper portion 60 and the second multilayer stopper portion 70 are provided at positions that do not overlap each other, as viewed in the plan view of the etalon 5. However, as a modification of this, a configuration as shown in FIG. 5 may be employed. That is, the first multilayer stopper portion 60 and the second multilayer stopper portion 70 are provided at such positions that a portion of the first multilayer stopper portion 60 and a portion of the second multilayer stopper portion 70 overlap each other, as viewed in the plan view. The first multilayer stopper portion 60 and the second multilayer stopper portion 70 abut each other, thereby preventing the mirrors 54, 55 from contacting and sticking to each other.

Again, in such a configuration, the inner circumferential edge of the first multilayer stopper portion has a smaller diameter dimension than the inner circumferential edge of the second multilayer stopper portion 70 and is provided inside the inner circumferential edge of the second multilayer stopper portion. Thus, the light transmitting area for inspection target light transmitted through the etalon 5 can be prescribed.

Also, in this modification, since the first multilayer stopper portion 60 and the second multilayer stopper portion 70 are formed to overlap each other in a plan view of the etalon, the gap G2 is the dimension between the multilayer stopper portions 60, 70.

According to this modification, when the dimension of the inter-mirror gap G1 is reduced, the multilayer stopper portions 60, 70 contact each other. In this case, in the state where the movement of the movable portion 522 is regulated by the contact of the multilayer stopper portions 60, 70, the space between the mirrors 54, 55 is greater than in the first embodiment. Therefore, contacting and sticking of the mirrors 54, 55 can be prevented more securely.

Also, in this modification, an insulating film may be formed to cover the first electrode 561 or formed to cover the second electrode 562 only, as in the first embodiment. Alternatively, an insulating film may be formed to cover both the first electrode 561 and the second electrode 562.

Second Modification of First Embodiment

Figure 6:
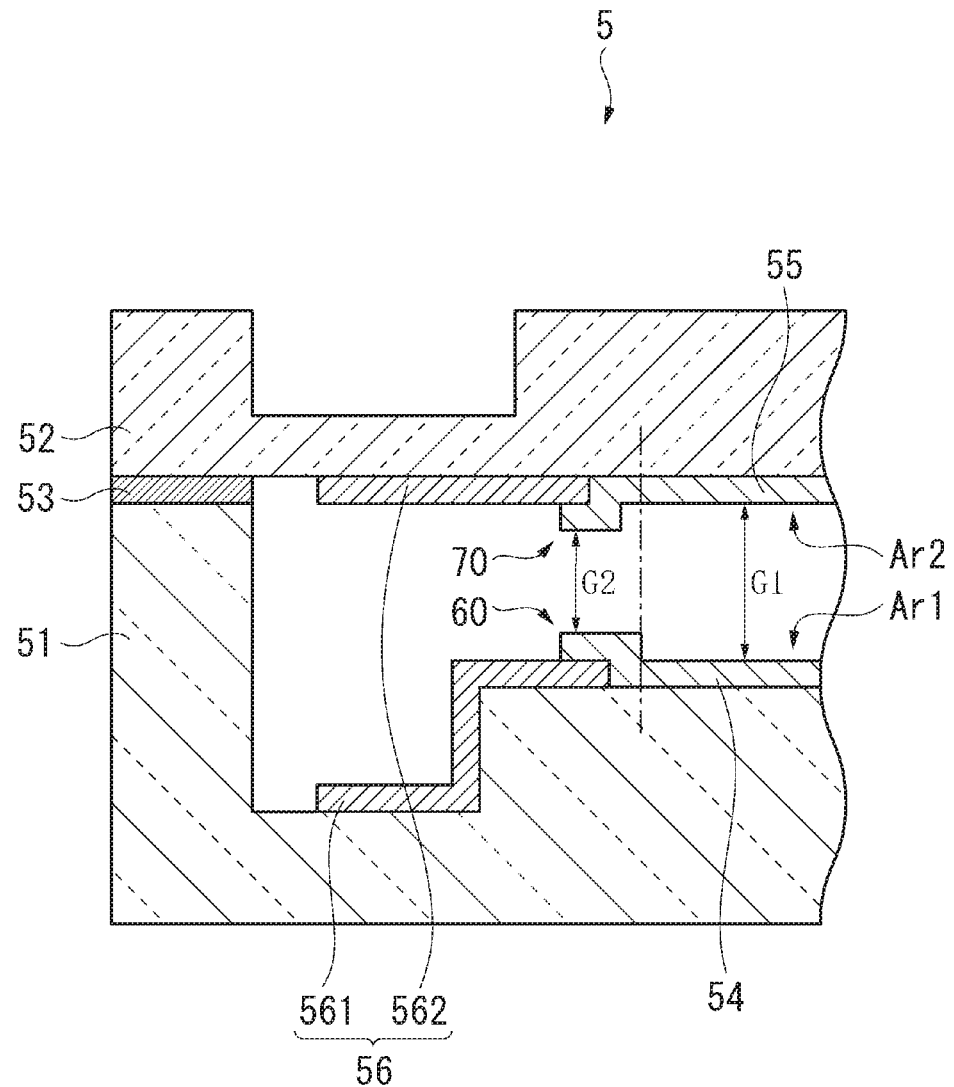
FIG. 6 is a partial sectional view showing parts of an etalon according to a second modification of the first embodiment.

FIG. 6 is a partial sectional view showing parts of the etalon 5 according to a second embodiment of the first embodiment.

The multilayer stopper portions 60, 70 in the first embodiment are configured with the mirrors 54, 55 and the electrodes 561, 562 stacked in this order from the substrates 51, 52. However, as a modification, the electrodes 561, 562 and the mirrors 54, 55 may be stacked in order from the substrates 51, 52, as shown in FIG. 6.

In the manufacturing process of the etalon 5 with such a configuration, the mirrors 54, 55 are deposited after the electrodes 561, 562 are deposited. Therefore, the process of forming the mirrors 54, 55, which can easily be deteriorated in optical properties such as transmittance and reflectance by such factors as ambient temperature, can be shifted to a later stage, and damage to the mirrors 54, 55 during the manufacturing process can be prevented securely.

Also, for example, if the fixed mirror 54 is formed as a dielectric multilayer film, a portion or the entirety of the dielectric multilayer film may be formed on the first electrode 561 and the second electrode 562 and may be used as an insulating layer. With such a configuration, the process of forming the insulating layer can be omitted and the manufacturing process can be simplified further.

FIG. 6 shows the configuration in which the first multilayer stopper portion 60 and the second multilayer stopper portion 70 abut each other to prevent the mirrors 54, 55 from contacting and sticking to each other, as in the first modification. However, as in the first embodiment, the first multilayer stopper portion 60 and the second multilayer stopper portion 70 may be provided at positions that do not overlap each other, as viewed in the plan view of the etalon 5.

Figure 7:
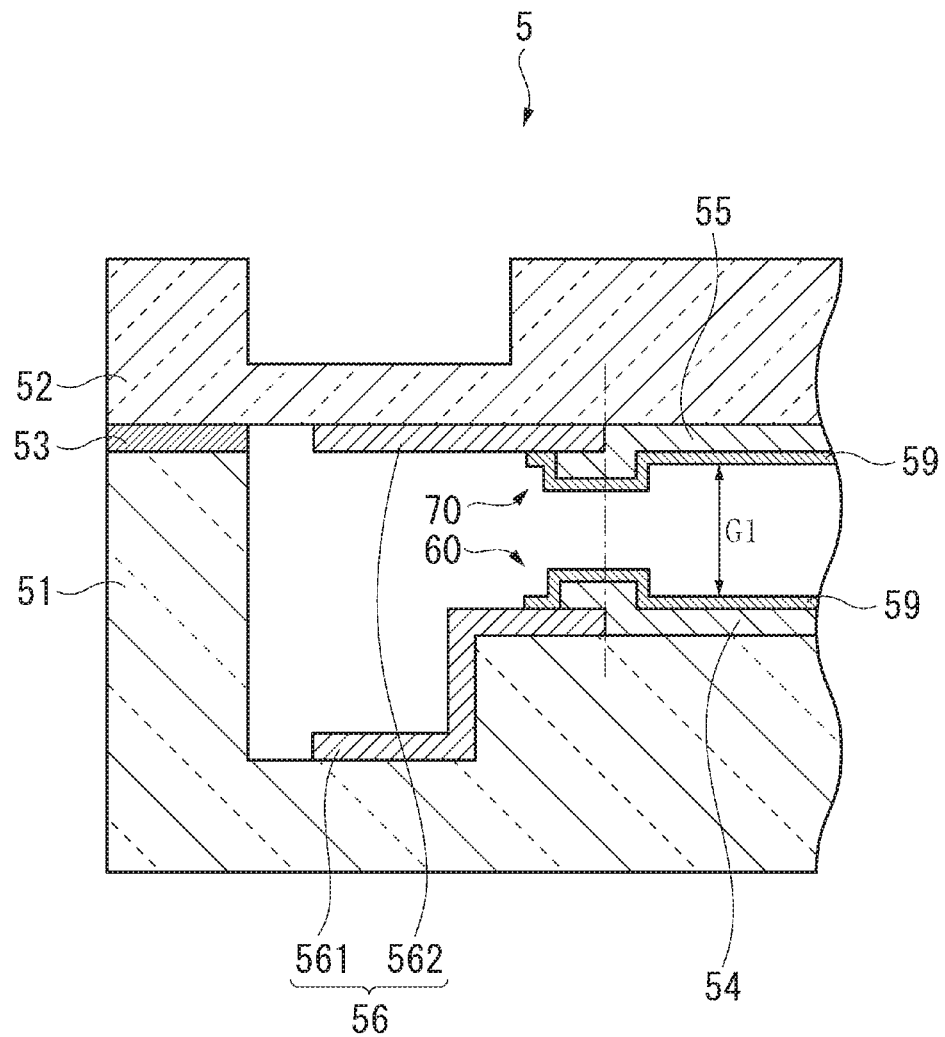
FIG. 7 is a partial sectional view showing parts of the etalon according to the second modification of the first embodiment.

Alternatively, in the above configuration, mirror protection films 59 may be formed to cover the mirrors 54, 55 and the multilayer stopper portions 60, 70, as shown in FIG. 7. Silicon (Si) oxide films are used as the mirror protection films 59. Also, aluminum (Al) oxide films, magnesium (Mg) fluoride films and the like can be used.

With such a configuration, when the inter-mirror gap G1 is reduced and the first multilayer stopper portion 60 and the second multilayer stopper portion 70 contact each other, the mirror protection films 59 cover the mirrors 54, 55 and therefore can securely prevent damage to the mirrors 54, 55. Moreover, since the mirror protection films 59 cover the outer circumferential edges of the mirrors 54, 55, which tend to be deteriorated or detached easily, deterioration and detachment of the mirrors 54, 55 can be prevented.

Third Modification of First Embodiment

Figure 8:
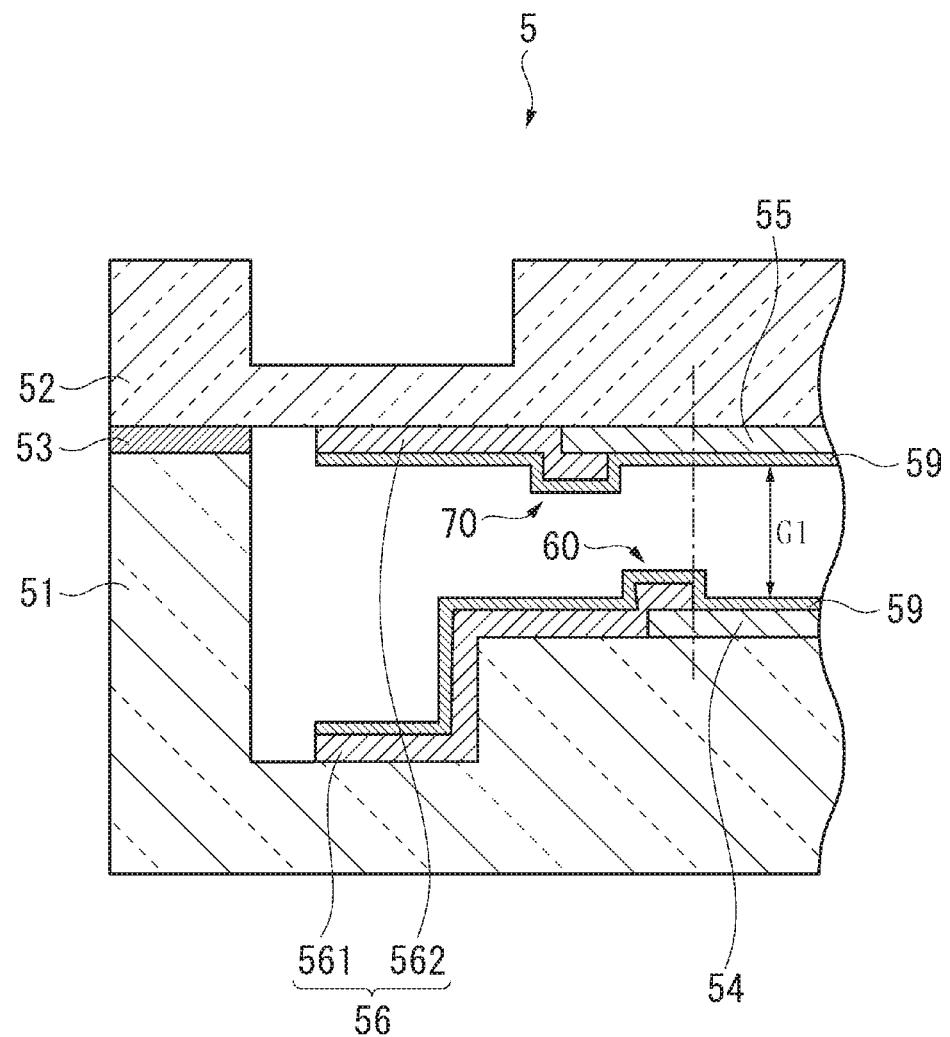
FIG. 8 is a partial sectional view showing parts of an etalon according to a third modification of the first embodiment.

FIG. 8 is a partial sectional view showing parts of the etalon 5 according to a third modification of the first embodiment.

In the first embodiment, the insulating film 563 covering the first electrode 561 is formed. However, insulative mirror protection films 59 covering the mirrors 54, 55 and the electrodes 561, 562 may be formed.

With such a configuration, the mirror protection films 59 can restrain deterioration of the mirrors 54, 55 and can also prevent discharge and leak between the first electrodes 561 and the second electrode 562.

Fourth Modification of First Embodiment

Figure 9:
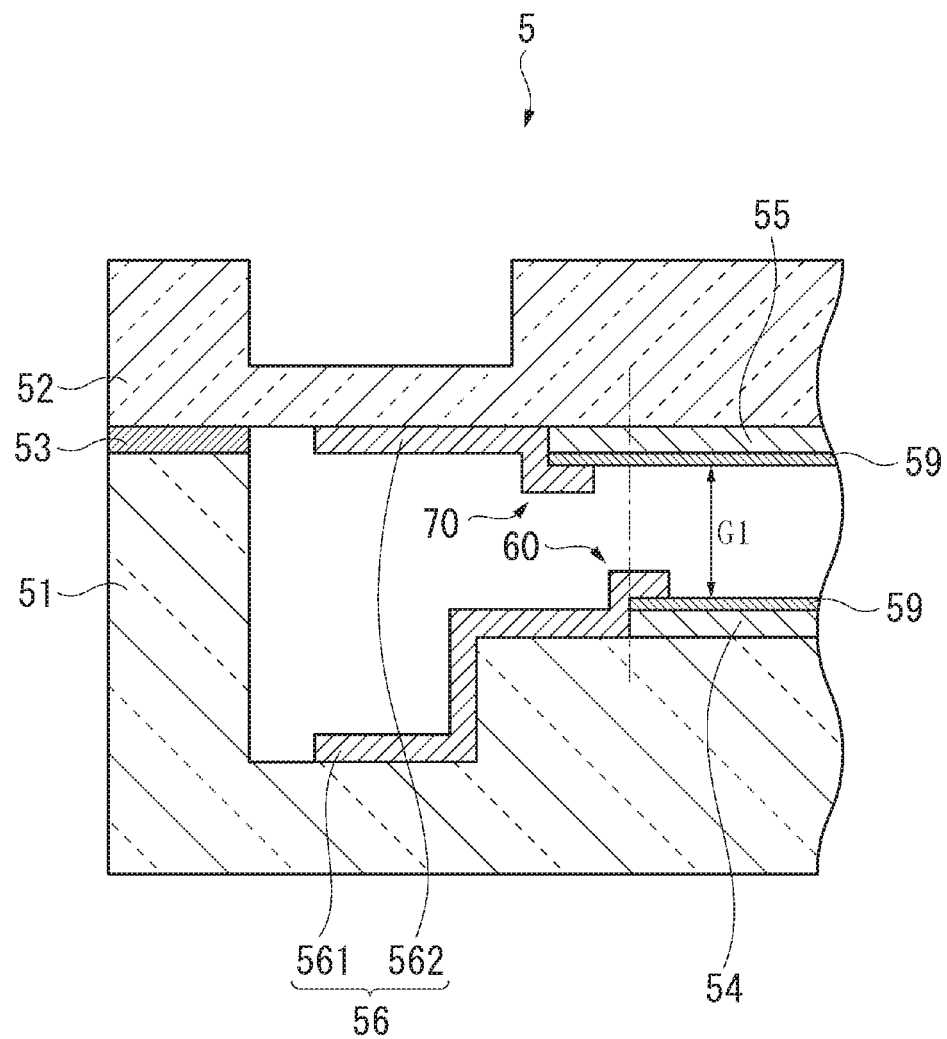
FIG. 9 is a partial sectional view showing parts of an etalon according to a fourth modification of the first embodiment.

FIG. 9 is a partial sectional view showing parts of the etalon 5 according to a fourth modification of the first embodiment.

In the third modification of the first embodiment, the mirror protection films 59 are formed to cover the mirrors 54, 55 and the multilayer stopper portions 60, 70. However, at the multilayer stopper portions 60, 70, the mirror protection films 59 may be formed between the electrodes 561, 562 and the mirrors 54, 55 and thus formed to cover the mirrors 54, 55.

According to this modification, the mirror protection films 59 can restrain deterioration of the mirrors 54, 55.

Fifth Modification of First Embodiment

Figure 10:
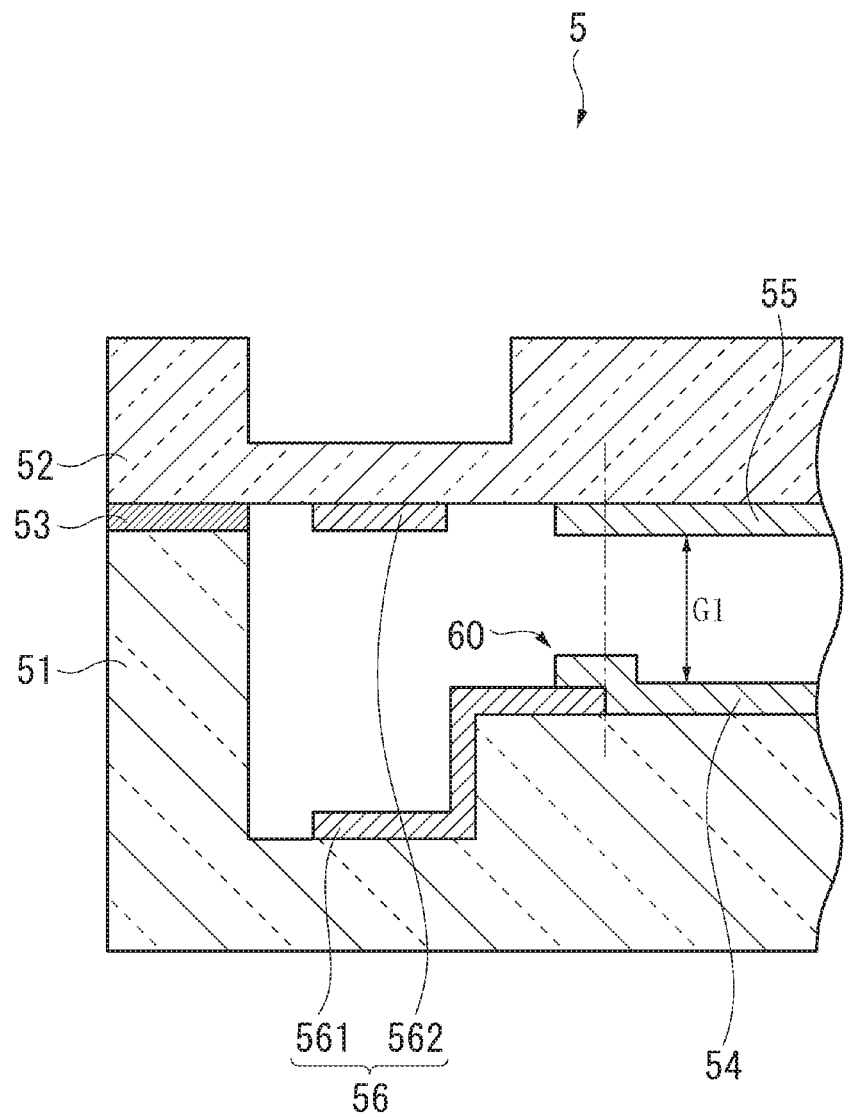
FIG. 10 is a partial sectional view showing parts of an etalon according to a fifth modification of the first embodiment.

FIG. 10 is a partial sectional view showing parts of the etalon 5 according to a fifth modification of the first embodiment.

In the first embodiment, the multilayer stopper portions 60, 70 are formed on both the first substrate 51 and the second substrate 52. However, a configuration in which the first multilayer stopper portion 60 is provided only on the first substrate 51 may be employed.

FIG. 10 illustrates a case where the diameter dimensions of the mirrors 54, 55 are formed to the same dimension, as in the first modification. However, the diameter dimensions of the mirrors 54, 55 may be different, as in the first embodiment.

Also, in this modification, mirror protection films may be provided to cover the mirrors 54, 55. Moreover, an insulating film may be formed to cover the first electrode 561 or formed to cover the second electrode 562 only. Alternatively, an insulating film may be formed to cover both the first electrode 561 and the second electrode 562.

Moreover, a configuration in which the second multilayer stopper portion 70 is provided only on the second substrate 52, without providing the first multilayer stopper portion 60 on the first substrate 51, may be employed.

Second Embodiment

Hereinafter, a second embodiment of the invention will be described with reference to FIG. 11 to FIG. 13.

Figure 11:
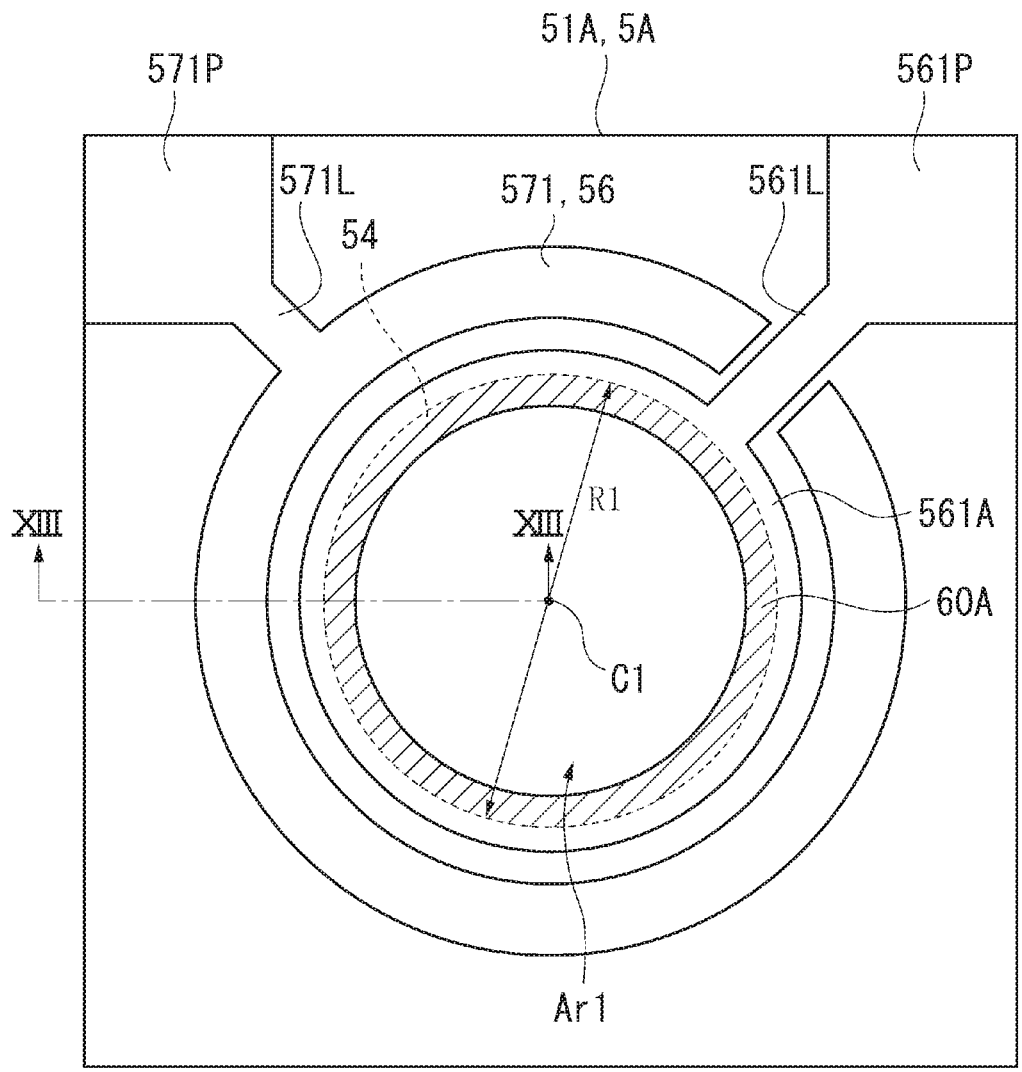
FIG. 11 is a plan view of a first substrate of an etalon according to a second embodiment of the invention.

FIG. 11 is a plan view of a first substrate 51A of an etalon 5A according to this embodiment. FIG. 12 is a plan view of a second substrate 52A. In FIG. 11, and FIG. 12, for convenience of illustration, only electrodes 561A, 562A and mirrors 54, 55 formed on substrates 51A, 52A are shown.

Figure 12:
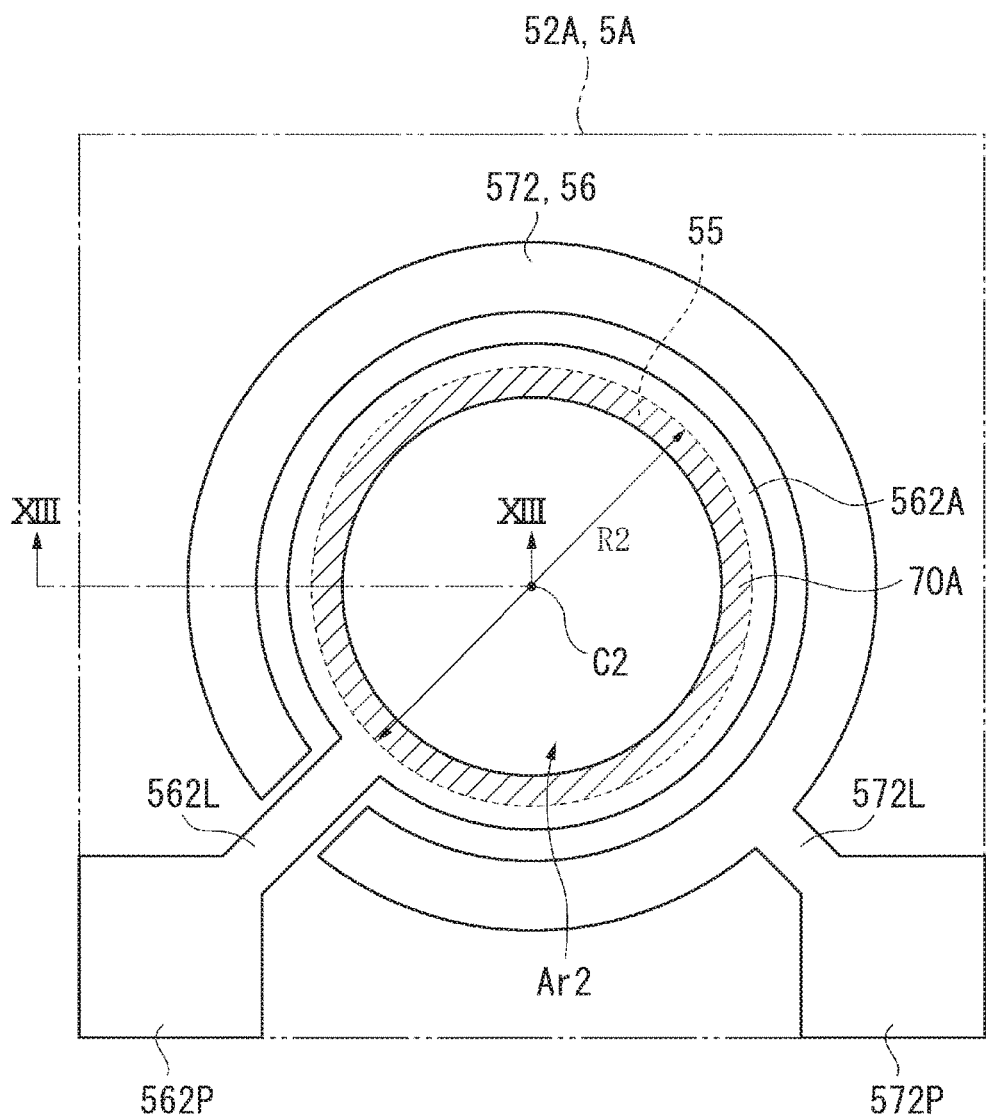
FIG. 12 is a plan view of a second substrate of the etalon according to the second embodiment.
Figure 13:
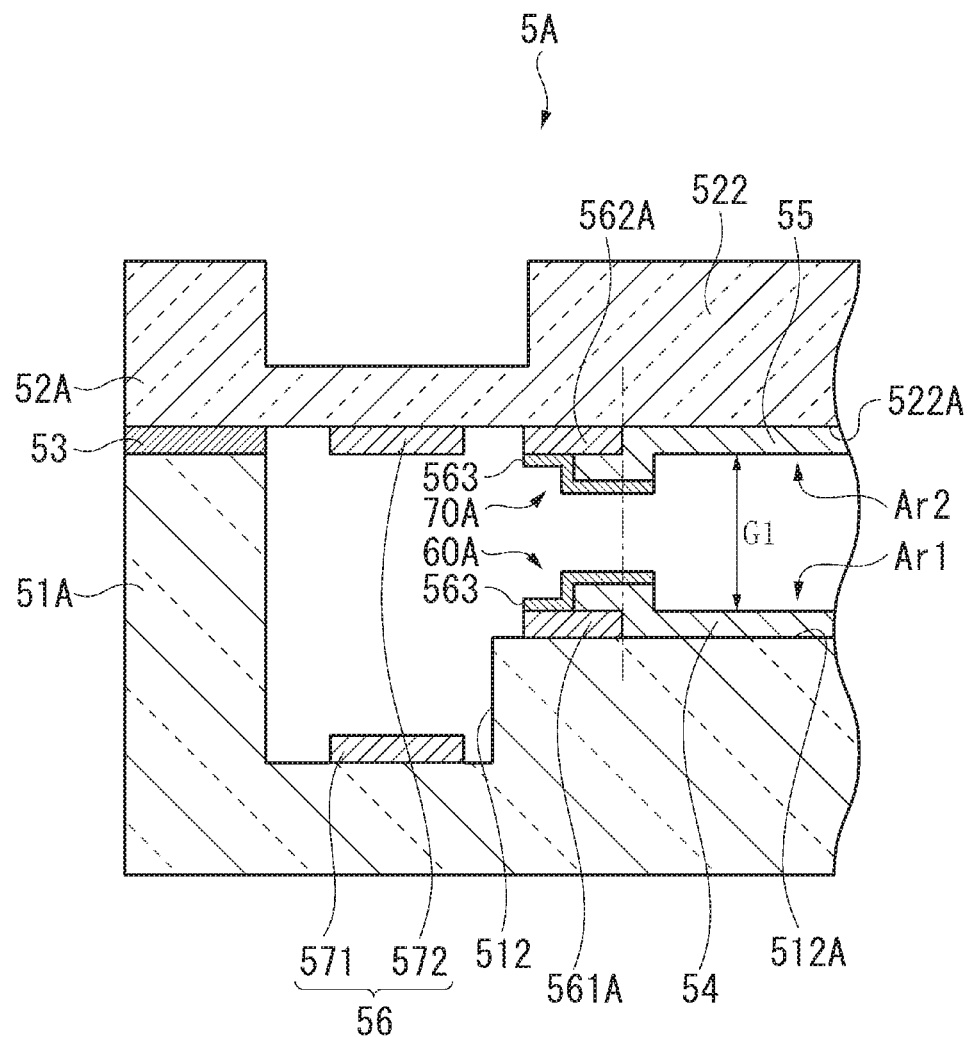
FIG. 13 is a partial sectional view showing parts of the etalon according to the second embodiment.

FIG. 13 is a partial sectional view showing parts of the etalon 5A taken along arrow line XIII-XIII in FIG. 11 and FIG. 12.

The etalon 5A of this embodiment has a similar configuration to the etalon 5 of the first embodiment but it is different in that the etalon 5A of this embodiment has a first drive electrode 571 and a second drive electrode 572 in addition to the first electrode 561A and the second electrodes 562A, and that the first drive electrode 571 and the second drive electrode 572 form the electrostatic actuator 56.

In the following description, the same components as in the first embodiment are denoted by the same reference numerals and will not be described further in detail.

The diameter dimensions R1, R2 of the mirrors 54, 55 in this embodiment may be formed to the same dimension, and the light transmitting areas Ar1, Ar2 of the mirrors 54, 55 (areas toward the mirrors 54, 55 from the chain dotted line in FIG. 13) may be formed to the same size. In this case, the light transmitting area for inspection target light transmitted through the etalon 5A is prescribed by the light transmitting areas Ar1, Ar2 of the mirrors 54, 55.

A first multilayer stopper portion 60A is configured by stacking the first electrode 561A and the fixed mirror 54 in this order from the first substrate 51A, as shown in FIG. 13.

A second multilayer stopper portion 70A is configured by stacking the second electrodes 562A and the movable mirror 55 in this order from the second substrate 52A, as shown in FIG. 13.

The first multilayer stopper portion 60A and the second multilayer stopper portion 70A may be configured by stacking the mirrors 54, 55 and the electrodes 561A, 562A in this order from the substrates 51A, 52A, as in the first embodiment.

The first electrode 561A and the second electrodes 562A are for holding electric charge and function as electrostatic capacitance measuring electrodes. Therefore, the insulating films 563 are provided on the first electrode 561A and the second electrodes 562A, as shown in FIG. 13, to prevent leak between the electrodes 561A, 562A. The insulating films 563 are also formed on the fixed mirror 54 and the movable mirror 55 and also function as mirror protection films. That is, even when the inter-mirror gap G1 is reduced and the multilayer stopper portions 60A, 70A contact each other, damage to the mirrors 54, 55 is prevented.

The first electrode 561A is formed only on the mirror fixing surface 512A of the mirror fixing portion 512. The second electrodes 562A is formed only on the movable surface 522A of the movable portion 522.

The quantity of electric charge held by the first electrode 561A is detected by the voltage control unit 6 (see FIG. 1) via the first electrode pad 561P (see FIG. 11). The quantity of electric charge held by the second electrodes 562A is detected by the voltage control unit 6 (see FIG. 1) via the second electrode pad 562P (see FIG. 12). Based on the detected electrostatic capacitance, the voltage control unit 6 (see FIG. 1) calculates the gap and applies a voltage for setting the inter-mirror gap G1 to a desired gap, to the first drive electrode 571 and the second drive electrode 572. That is, the inter-mirror gap G1 is accurately set to a desired gap.

Each of the first drive electrode 571 and the second drive electrode 572 is formed in a C-shape as viewed in a plan view of the etalon, as shown in FIG. 11 and FIG. 12. The second drive electrode 572 is formed on the surface of the connection holding portion 523 that faces the first substrate 51A. The first drive electrode 571 is formed on the surface of the first substrate 51A that faces the second drive electrode 572.

The first drive electrode 571 is formed outside the first electrode 561A, centering on the center point C1 of the fixed mirror 54 and concentric with the first electrode 561A, as shown in FIG. 11. One first drive electrode line 571L is formed extending toward top left from a portion on the outer circumferential edge of the first drive electrode 571 so as to follow a diagonal line on the first substrate 51A, as viewed in the plan view of FIG. 11.

A first drive electrode pad 571P is formed at the distal end of the first drive electrode line 571L. The first drive electrode pad 571P is connected to the voltage control unit 6 (see FIG. 1). At the time of driving the electrostatic actuator 56, a voltage is applied to the first drive electrode pad 571P by the voltage control unit 6 (see FIG. 1).

The second drive electrode 572 is formed outside the second electrode 562A, centering on the center point C2 of the movable mirror 55 and concentric with the second electrode 562A, as shown in FIG. 12. One second drive electrode line 572L is formed extending toward bottom left from a portion on the outer circumferential edge of the second drive electrode 572 so as to follow a diagonal line on the second substrate 52A, as viewed in the plan view of FIG. 12.

A second drive electrode pad 572P is formed at the distal end of the second drive electrode line 572L. The second drive electrode pad 572P is connected to the voltage control unit 6 (see FIG. 1). At the time of driving the electrostatic actuator 56, a voltage is applied to the second drive electrode pad 572P by the voltage control unit 6 (see FIG. 1).

The etalon 5A according to the second embodiment has the following advantages as well as the advantages of the first embodiment.

According to this embodiment, the first electrode 561A and the second electrodes 562A function as electrostatic capacitance measuring electrodes. The voltage control unit 6 calculates the gap based on the detected electrostatic capacitance and applies a voltage for setting the inter-mirror gap G1 to a desired gap, to the first drive electrode 571 and the second drive electrode 572. Thus, the inter-mirror gap G1 can be accurately set to a desired gap.

In the process of manufacturing the etalon 5A, the multilayer stopper portions 60A, 70A can be easily formed by the process of forming the mirrors 54, 55 and the process of forming the first electrode 561A and the second electrodes 562A (electrostatic capacitance measuring electrodes).

Third Embodiment

Hereinafter, a third embodiment of the invention will be described with reference to FIG. 14.

Figure 14:
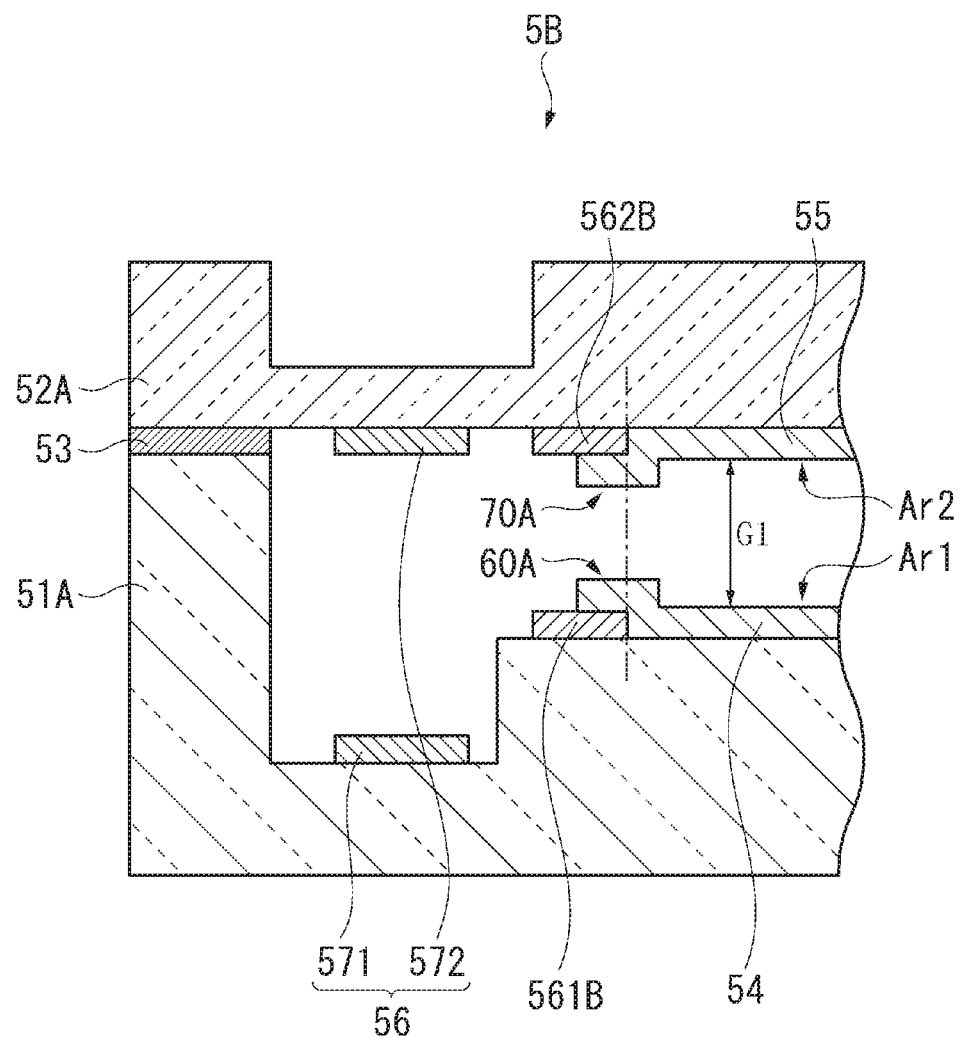
FIG. 14 is a partial sectional view showing parts of an etalon according to a third embodiment of the invention.

FIG. 14 is a partial sectional view showing parts of an etalon 5B according to this embodiment.

Again, the etalon 5B of this embodiment has the first drive electrode 571 and the second drive electrode 572 in addition to a first electrode 561B and a second electrode 562B, as in the second embodiment. The first drive electrode 571 and the second drive electrode 572 form the electrostatic actuator 56.

In the following description, the same components as in the first embodiment are denoted by the same reference numerals and will not be described further in detail. The first drive electrode 571 and the second drive electrode 572 have the same configuration as in the second embodiment and therefore will not be described further.

The first multilayer stopper portion 60A and the second multilayer stopper portion 70A in this embodiment are configured by stacking the electrodes 561B, 562B and the mirrors 54, 55 in this order from the substrates 51A, 52A, as in the second embodiment.

Also, the multilayer stopper portions 60A, 70A may be configured by stacking the mirrors 54, 55 and the electrodes 561B, 562B in this order from the substrates 51A, 52A, as in the first embodiment.

The first electrode 561B and the second electrode 562B function as electric charge removing electrodes for removing an electric charge stored in the mirrors 54, 55. Therefore, in this embodiment, the first electrode line 561L and the second electrode line 562L formed in the first embodiment are connected to a ground and the electric potential difference between the first electrode 561B and the second electrode 562B is set to be 0.

It is also possible to use one of the first electrode 561B and the second electrode 562B as an electric charge removing electrode.

The etalon 5B according to the third embodiment has the following advantages as well as the advantages of the first embodiment.

According to this embodiment, the first electrode 561B and the second electrode 562B function as electric charge removing electrodes for removing electric charge in the mirrors 54, 55. Moreover, when the dimension of the inter-mirror gap G1 is reduced and the multilayer stopper portions 60A, 70A contact each other, an electric charge held in the mirrors 54, 55 can be released from the first electrode 561B and the second electrode 562B (electric charge removing electrodes) of the multilayer stopper portions 60A, 70A. Therefore, electrostatic attraction due to an electric charge held in each of the mirrors 54, 55 does not occur and the inter-mirror gap G1 can be accurately set to a desired gap dimension.

Fourth Embodiment

Hereinafter, a fourth embodiment of the invention will be described with reference to FIG. 15 and FIG. 16.

Figure 15:
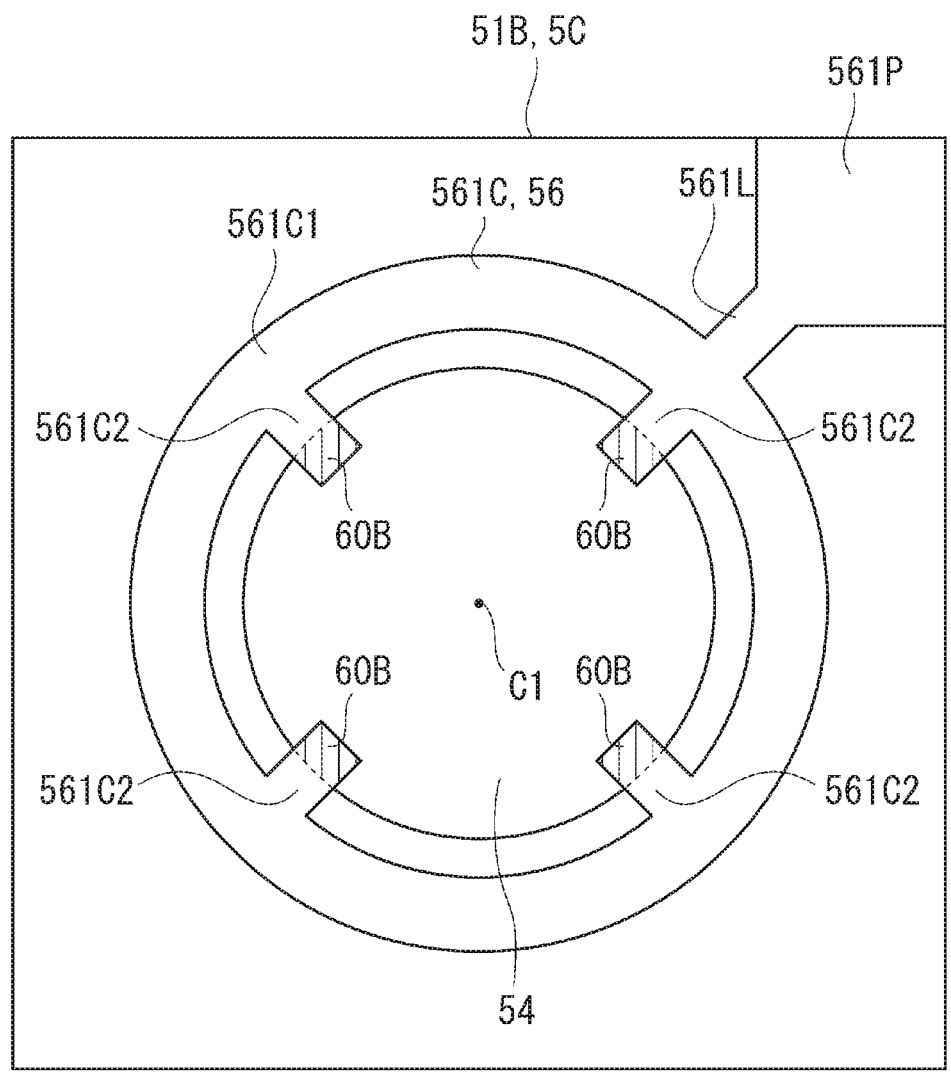
FIG. 15 is a plan view of a first substrate of an etalon according to a fourth embodiment of the invention.

FIG. 15 is a plan view showing a first substrate 51B of an etalon 5C according to this embodiment. FIG. 16 is a plan view showing a second substrate 52B of the etalon 5C. In FIG. 15 and FIG. 16, as in FIG. 11 and FIG. 12, only electrodes 561C, 562C and mirrors 54, 55 formed on the substrates 51B, 52B are shown for convenience of illustration.

The etalon 5C of this embodiment is different in that multilayer stopper portions 60B, 70B are formed at equal intervals along the circumferential direction of imaginary circles centering on the center points C1, C2 of the mirrors 54, 55, whereas the multilayer stopper portions 60, 70 in the first embodiment are ring-shaped.

In the following description, the same components as in the first embodiment are denoted by the same reference numerals and will not be described further in detail.

On a first electrode 561C of the etalon 5C according to this embodiment, four first extending portions 561C2 extending at intervals of 90 degrees are formed in the circumferential direction of a first ring portion 561C1 of the first electrode 561C, as shown in FIG. 15. Specifically, the first extending portions 561C2 extend toward the center point C1 of the fixed mirror 54 from the first ring portion 561C1, along the diagonal lines across the first substrate 51B. As the distal end sides of the four first extending portions 561C2 are stacked on the outer circumferential edge of the fixed mirror 54, four first multilayer stopper portions 60B are formed.

That is, the first multilayer stopper portions 60B are provided at intervals of 90 degrees along the circumferential direction of the imaginary circle (the first ring portion 561C1 of the first electrode 561C) centering on the center point C1 of the fixed mirror 54, as shown in FIG. 15. In other words, the four first multilayer stopper portions 60B are formed with point symmetry about the center point C1 of the fixed mirror 54 as the center of symmetry.

Figure 16:
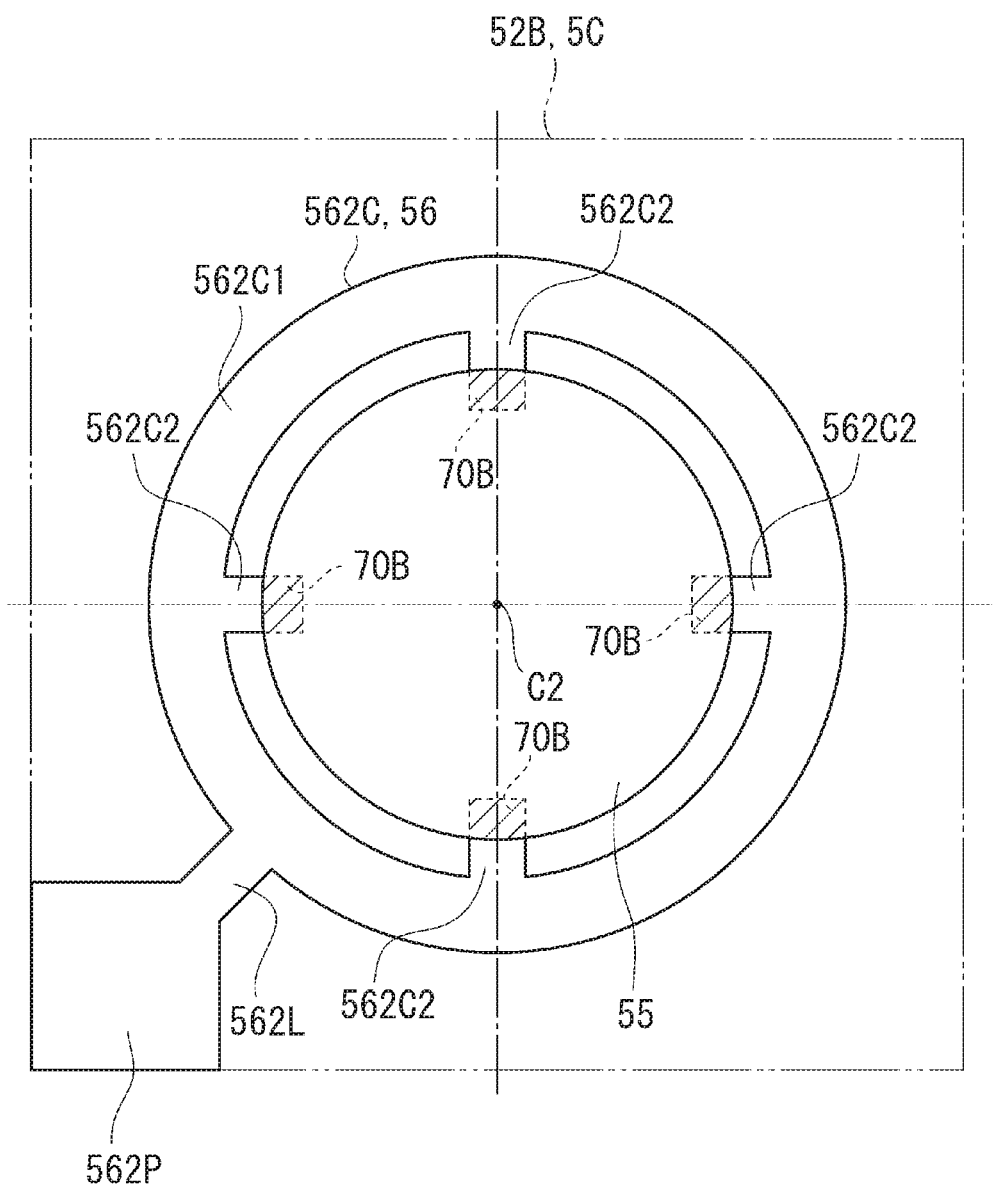
FIG. 16 is a plan view of a second substrate of the etalon according to the fourth embodiment.

On a second electrode 562C, four second extending portions 562C2 extending at intervals of 90 degrees are formed in the circumferential direction of a second ring portion 562C1 of the second electrode 562C, as shown in FIG. 16. Specifically, the second extending portions 562C2 extend toward the center point C2 of the movable mirror 55 from the second ring portion 562C1, along the center lines (chain dotted lines in FIG. 16) of the second substrate 52B. Since the distal end sides of the four second extending portions 562C2 are stacked on the outer circumferential edge of the movable mirror 55, four second multilayer stopper portions 70B are formed.

That is, the second multilayer stopper portions 70B are provided at intervals of 90 degrees along the circumferential direction of the imaginary circle (the second ring portion 562C1 of the second electrode 562C) centering on the center point C2 of the movable mirror 55, as shown in FIG. 16. In other words, the four second multilayer stopper portions 70B are formed with point symmetry about the center point C2 of the movable mirror 55 as the center of symmetry.

Moreover, the second multilayer stopper portions 70B are formed at positions that are shifted 45 degrees respectively from the first multilayer stopper portions 60B about the center points C1, C2 of the mirrors 54, 55, as viewed in the plan view of the etalon. Therefore, the second multilayer stopper portions 70B are formed at positions that do not overlap the first multilayer stopper portions 60B.

In the above configuration, when the inter-mirror gap G1 (see FIG. 4) is reduced, the second multilayer stopper portions 70B contact the fixed mirror 54, and the first multilayer stopper portions 60B contact the movable mirror 55. Thus, the mirrors 54, 55 are prevented from contacting each other.

Insulating films may be provided on the electrodes 561C, 562C of this embodiment. Also, the third modification and the fourth modification of the first embodiment may be applied to this embodiment.

The multilayer stopper portions 60B, 70B of this embodiment are provided at intervals of 90 degrees along the circumferential direction of the imaginary circles. However, the multilayer stopper portions 60B, 70B may be provided, for example, at intervals of 180 degrees. It suffices that the multilayer stopper portions 60B, 70B are provided at equal intervals.

Moreover the multilayer stopper portions 60B, 70B are formed at positions that do not overlap each other, as viewed in the plan view of the etalon. However, the multilayer stopper portions 60B, 70B may be formed in such a manner as to overlap each other.

As the stacking order of the multilayer stopper portions 60B, 70B of this embodiment, the stacking order of the multilayer stopper portions 60A, 70A in the first modification of the first embodiment, the second embodiment, and the third embodiment may be employed. In this case, if mirror protection films are provided on the mirrors 54, 55, damage to the mirrors 54, 55 can be prevented even when the multilayer stopper portions 60B, 70B contact the mirrors 54, 55, respectively.

Moreover, the mirrors 54, 55 of this embodiment may be made of an Ag alloy, thereby functioning as drive electrodes. The first electrode 561C and the second electrode 562C, and the first electrode line 561L and the second electrode line 562L may be made to function as electrode lines connected to the mirrors 54, 55. In this case, a voltage applied from the electrodes pads 561P, 562P is applied to the mirrors 54, 55 via the electrode lines. Thus, electrostatic attraction is generated between the mirrors 54, 55 and the inter-mirror gap can be changed.

The etalon 5C according to the fourth embodiment has the following advantages as well as the advantages of the first embodiment.

According to this embodiment, since the multilayer stopper portions 60B, 70B are provided at equal intervals along the circumferential direction of the imaginary circles centering the center point C1, C2 of the mirrors 54, 55, the multilayer stopper portions 60B, 70B and the mirrors 54, 55 facing the multilayer stopper portions 60B, 70B contact each other and the contact area can be made smaller than in the first embodiment. Thus, attraction at the contact portion can be prevented and the gap G1 between the mirrors 54, 55 can be accurately set to a desired gap dimension.

Modification of Embodiments

The invention is not limited to the above embodiments and includes modifications and improvements within a range that allows achievement of the objects of the invention.

In the embodiments, the first and second multilayer stopper portions 60, 70 are provided on the substrates 51, 52. However, a configuration in which a multilayer stopper portion is provided only on one of the substrates may be employed, as in the fifth modification of the first embodiment.

In the first embodiment and the third embodiment, the multilayer stopper portions 60, 70 are ring-shaped. However, the multilayer stopper portions may be formed at equal intervals along the circumferential direction of imaginary circles centering on the center points C1, C2 of the mirrors 54, 55, as in the fourth embodiment.

In the third embodiment, the electric potential difference between the first electrode 561B and the second electrode 562B is set to be 0. However, an equal potential may be achieved by electrical connection of the mirrors 54, 55 as the mirrors 54, 55 contact each other.

In the embodiments, the electrostatic actuator 56 is described as an example of the configuration for changing the inter-mirror gap G1. However, an electromagnetic actuator including an electromagnetic coil through which a current flows and a permanent magnet which moves in relation to the electromagnetic coil by an electromagnetic force may be used. With such a configuration, a current flows through the electromagnetic coil, and the permanent magnet moves toward the electromagnetic coil by an electromagnetic force due to a magnetic flux from the permanent magnet and interaction between this magnetic flux and the current. Thus, a displaced portion changes. Alternatively, a configuration in which a piezoelectric element that can expand and contract by voltage application is provided between substrates may be employed.

In the embodiments, the bonding surfaces 513, 524 are bonded by the bonding layer 53. However, the bonding configuration is not limited to this. Any bonding method may be used. For example, so-called room-temperature activated bonding may be used, in which the bonding layer 53 is not formed and the bonding surfaces 513, 524 are activated and the activated bonding surfaces 513, 524 are superimposed and pressurized for bonding.

In the embodiments, by way of example, the mirror fixing surface 512A of the mirror fixing portion 512 that faces the movable substrate 52 is formed more closely to the movable substrate 52 than the electrode fixing surface 511A is. However, the configuration of these surfaces is not limited to this example. The height positions of the electrode fixing surface 511A and the mirror fixing surface 512A are properly set, based on the dimension of the gap between the fixed mirror 54 fixed to the mirror fixing surface 512A and the movable mirror 55 formed on the movable substrate 52, the dimension between the first electrode 561 and the second electrode 562, the thickness dimensions of the fixed mirror 54 and the movable mirror 55, and the like. Therefore, for example, a configuration in which the electrode fixing surface 511A and the mirror fixing surface 512A are formed on the same plane, or a configuration in which a mirror fixing groove in the shape of a cylindrical groove is formed at a center part of the electrode fixing surface 511A, with a mirror fixing surface formed on a bottom surface of the mirror fixing groove, may be employed.

In the embodiment, the colorimetric sensor 3 is described as an example of the optical module of the invention, and the colorimeter device 1 having the colorimetric sensor 3 is described as an example of the optical analysis device. However, the optical module and the optical analysis device are not limited to these. For example, a gas sensor which detects light absorbed by a gas, of incident light, as the gas flows into the sensor, may be used as the optical module of the invention. A gas detecting device which, with such a gas sensor, analyzes and determines the gas flowing into the sensor, may be used as the optical analysis device of the invention. Moreover, the optical analysis device may be a spectroscopic camera, spectroscopic analyzer or the like having such an optical module.

It is also possible to transmit data via light of each wavelength by changing the intensity of light of each wavelength with time. In this case, light of a specific wavelength is spectrally separated by the etalon 5 provided in the optical module and received by the light receiving unit. Thus, data to be transmitted via the light of the specific wavelength can be extracted. If light data of each wavelength is processed by an optical analysis device having such an optical module for data extraction, optical communication can be carried out.

What is claimed is:

1. A variable wavelength interference filter comprising:
   a first substrate;
   a second substrate that faces the first substrate;
   a first mirror having a first continuous edge, the first mirror being disposed between the first substrate and the second substrate;
   a second mirror having a second continuous edge, the second mirror being disposed between the first mirror and the second substrate;
   a first electrode that is disposed between the first substrate and the second substrate; and
   a second electrode that is disposed between the first substrate and the second substrate,
   wherein the first and second electrodes each define a continuous inner edge and a continuous outer edge, and the first and second electrodes each overlap the first and second mirrors, respectively, such that in a plan view the continuous inner edges of the first and second electrodes are located inboard from the first and second continuous edges of the first and second mirrors, respectively, such that the first electrode is electrically connected to the first mirror, and the second electrode is electrically connected to the second mirror.

2. A variable wavelength interference filter comprising:
a first substrate;
a second substrate that faces the first substrate;
a first mirror having a first continuous edge, the first mirror being disposed between the first substrate and the second substrate;
a second mirror having a second continuous edge, the second mirror being disposed between the first mirror and the second substrate;
a first electrode that is disposed between the first substrate and the second substrate; and
a second electrode that is disposed between the first substrate and the second substrate,
wherein the first and second electrodes each define a continuous inner edge and a continuous outer edge, and the first and second electrodes each overlap the first and second mirrors, respectively, such that in a plan view the continuous inner edges of the first and second electrodes are located inboard from the first and second continuous edges of the first and second mirrors, respectively, and such that the first and second continuous edges of the first and second mirrors, respectively, entirely surround the continuous inner edges of the first and second electrodes, respectively.

* * * * *